United States Patent
Benitez et al.

(10) Patent No.: US 10,436,951 B2
(45) Date of Patent: Oct. 8, 2019

(54) DISPLAY DEVICE WITH TOTAL INTERNAL REFLECTION

(71) Applicant: TESSELAND LLC, Glendale, CA (US)

(72) Inventors: Pablo Benitez, Madrid (ES); Juan Carlos Minano, Madrid (ES); Dejan Grabovickic, Madrid (ES); Marina Buljan, Madrid (ES); Pablo Zamora, Madrid (ES)

(73) Assignee: TESSELAND, LLC, Glendale, CA (US)

( * ) Notice: Subject to any disclaimer, the term of this patent is extended or adjusted under 35 U.S.C. 154(b) by 20 days.

(21) Appl. No.: 15/545,626

(22) PCT Filed: Jan. 20, 2016

(86) PCT No.: PCT/US2016/014155
§ 371 (c)(1),
(2) Date: Jul. 21, 2017

(87) PCT Pub. No.: WO2016/118643
PCT Pub. Date: Jul. 28, 2016

(65) Prior Publication Data
US 2018/0003862 A1     Jan. 4, 2018

Related U.S. Application Data

(60) Provisional application No. 62/105,905, filed on Jan. 21, 2015, provisional application No. 62/208,235, filed on Aug. 21, 2015.

(51) Int. Cl.
*H04N 7/18* (2006.01)
*A61B 1/04* (2006.01)
(Continued)

(52) U.S. Cl.
CPC ........... *G02B 3/0037* (2013.01); *G02B 27/01* (2013.01); *G02B 27/0172* (2013.01);
(Continued)

(58) Field of Classification Search
USPC ...... 348/61, 78, 68; 359/641, 642, 649, 726, 359/737, 738, 727, 741, 733
See application file for complete search history.

(56) References Cited

U.S. PATENT DOCUMENTS

| 5,699,194 A | * | 12/1997 | Takahashi | .......... | G02B 27/0101 |
| | | | | | 359/630 |
| 8,717,562 B2 | * | 5/2014 | Smart | ................ | G01N 15/0211 |
| | | | | | 356/336 |

(Continued)

FOREIGN PATENT DOCUMENTS

| EP | 2565700 A2 | 3/2013 |
| KR | 10-2002-0010966 A | 2/2002 |

(Continued)

OTHER PUBLICATIONS

International Search Report of PCT/US2016/014155, dated May 23, 2016 (May 23, 2016).
(Continued)

*Primary Examiner* — Daquan Zhao
(74) *Attorney, Agent, or Firm* — Drinker Biddle & Reath LLP

(57) ABSTRACT

A display device has a display to generate a real image. An optical system has lenslets, each generating a virtual sub-image from a respective partial real image on the display, by each lenslet projecting light from the display to an eye position. The sub-images combine to form a virtual image viewable from the eye position. At least one of the lenslets is an "RXIR" lenslet, in which the light rays from the display to the eye position are deflected sequentially at least four
(Continued)

times by a refraction (R), a reflection (X), a total internal or metallic reflection (I), and a refraction (R) in that order.

15 Claims, 26 Drawing Sheets

(51) Int. Cl.

| | | |
|---|---|---|
| *A61B 1/06* | (2006.01) | |
| *G02B 3/00* | (2006.01) | |
| *G02B 27/22* | (2018.01) | |
| *H04N 13/344* | (2018.01) | |
| *H04N 13/341* | (2018.01) | |
| *G02B 27/01* | (2006.01) | |
| *G06T 15/00* | (2011.01) | |
| *G02B 7/00* | (2006.01) | |
| *H04N 13/383* | (2018.01) | |
| *G02B 27/00* | (2006.01) | |
| *G06T 19/00* | (2011.01) | |

(52) U.S. Cl.
CPC .......... *G02B 27/2264* (2013.01); *G06T 15/00* (2013.01); *H04N 13/341* (2018.05); *H04N 13/344* (2018.05); *G02B 27/0093* (2013.01); *G02B 2027/0123* (2013.01); *G02B 2027/0134* (2013.01); *G06T 19/006* (2013.01); *H04N 13/383* (2018.05)

(56) References Cited

U.S. PATENT DOCUMENTS

| | | | |
|---|---|---|---|
| 9,699,441 B2 * | 7/2017 | Inaba | G02B 7/102 |
| 9,720,232 B2 * | 8/2017 | Hua | G06F 3/013 |
| 2002/0015233 A1 | 2/2002 | Park | |
| 2004/0070855 A1 | 4/2004 | Benitez et al. | |
| 2004/0108971 A1 | 6/2004 | Waldern et al. | |
| 2007/0024968 A1 | 2/2007 | Kim et al. | |
| 2007/0036537 A1 | 2/2007 | You et al. | |
| 2008/0049152 A1 | 2/2008 | Hong et al. | |
| 2016/0209657 A1 * | 7/2016 | Popovich | G02B 27/017 |

FOREIGN PATENT DOCUMENTS

| | | |
|---|---|---|
| WO | 2010123934 A1 | 10/2010 |
| WO | 2011134169 A1 | 11/2011 |

OTHER PUBLICATIONS

Written Opinion of the International Searching Authority of PCT/US2016/014155, dated May 23, 2016 (May 23, 2016).
Cheng et al.: "Large field-of-view and high resolution free-form head-mounted display" Proceedings of SPIE, vol. 7652, p. 76520D (Jul. 1, 2010).
Cheng et al: "Design of a wide-angle, lightweight head-mounted display using free-form optics tiling", Optics Letters, Optical Society of America, US, vol. 36, No. 11, pp. 2098-2100 (Jun. 1, 2011).
Extended European Search Report dated Sep. 20, 2018 (corresponding EP Appl. No. 16740687.5).

* cited by examiner

DISPLAY DEVICE WITH TOTAL INTERNAL REFLECTION

CROSS REFERENCE TO RELATED APPLICATIONS

This application claims benefit of commonly invented and assigned U.S. Provisional Patent Applications No. 62/105,905, filed on 21 Jan. 2015 for "Immersive Compact Display Glasses", and No. 62/208,235, filed on 21 Aug. 2015 for "Optical apparatus." Both of those applications are incorporated herein by reference in their entirety. This application contains subject matter related to commonly assigned WO 2015/077718 A1 (PCT/US 2014/067149) with inventors in common, for "Immersive compact display glasses," referred to herein as "PCT1," which is incorporated herein by reference in its entirety.

FIELD OF THE INVENTION

The application relates to visual displays, and especially to head-mounted display technology.

BACKGROUND

1. References Cited

WO 2015/077718 of Benitez et al. ("PCT1")
U.S. Pat. No. 4,924,215 to Nelson
U.S. Pat. No. 5,390,047 to Mizukawa
U.S. Pat. No. 5,699,194 to Takahashi
U.S. Pat. No. 5,701,202 to Takahashi
U.S. Pat. No. 5,706,136 to Okuyama & Takahashi
U.S. Pat. No. 7,689,116 to Ho Sik You et al.
U.S. Pat. No. 8,605,008 to Prest et al.
U.S. Pat. App. 2010/0277575 A1 of Ismael et al.
U.S. Pat. App. 2012/0081800 of Cheng et al.
D. Cheng, et al., "Design of a wide-angle, lightweight head-mounted display using free-form optics tiling," Opt. Lett. 36, 2098-2100 (2011)
http://www.xbitlabs.com/news/monitors/display/20100519223434_ToshibaDevelops_High_Speed_High_Contrast_Active_Shutter_3 D_Glasses.html ("Shilov 2010")
D. Fattal, Z. Peng, T. Tran, S. Vo, M. Fiorentino, J. Brug, and R. G. Beausoleil, "A multi-directional backlight for a wide-angle, glasses-free three-dimensional display," Nature, vol. 495, 7441, pp 348-351, 2013. DOI: 10.1038/nature11972. ("Fattal 2013")
H. Hoshi, N. Taniguchi, H. Morishima, T. Akiyama, S. Yamazaki, and A. Okuyama, "Off-axial HMD optical system consisting of aspherical surfaces without rotational symmetry," Proc. SPIE 2653, 234-242 (1996).
Inoguchi et al. "Fabrication and evaluation of HMD optical system consisting of aspherical mirrors without rotation symmetry," Japan Optics '95, Extended Abstracts, 20pB06, pp. 19-20, 1995).
J. J. Kerr, Visual resolution in the periphery, Perception & Psychophysics, Vol. 9 (3), 1971
J. E. Melzer, "Overcoming the Field of View: Resolution Invariant in Head Mounted Displays", SPIE Vol. 3362, 1998
H. Morishima, T. Akiyama, N. Nanba, and T. Tanaka, "The design of off-axial optical system consisting of aspherical mirrors without rotational symmetry," in 20th Optical Symposium, Extended Abstracts (1995), Vol. 21, pp. 53-56.

2. Definitions

| | |
|---|---|
| cluster | Set of active opixels that illuminates the pupil range through a given lenslet. The number of clusters is equal to the number of lenslets. |
| display | Component that modulates the light spatially to form an image. Currently available displays are mostly electronically operated, and are "digital" displays that generate an array of distinct pixels. The display can be self-emitting, such as an OLED display, or externally illuminated by a front or a backlight system, such as an LCD or an LCOS. The displays may be of the type called Light Field Displays (Huang 2015) implemented by stacked (transmissive) LCDs. Particularly interesting because of its thickness is the case of just 2 stacked LCDs with a separator between them. Light Field Displays support focus cues which together with the rest of the device help to solve the vergence-accommodation conflict at a reasonable cost and volume. |
| eye pupil | Image of the interior iris edge through the eye cornea seen from the exterior of the eye. In visual optics, it is referenced to as the input pupil of the optical system of the eye. Its boundary is typically a circle from 3 to 7 mm diameter depending on the illumination level. |
| eye sphere | Sphere centered at the approximate center of the eye rotations and with radius the average distance of the eye pupil to that center (typically 13 mm). |
| field of view | Field defined by horizontal and vertical full angles subtended by the virtual screen from the eye pupil center when the two eyes rest looking frontwards. |
| fixation point | Point of the scene that is imaged by the eye at center of the fovea, which is the highest resolution area of the retina and typically has a diameter of 1.5 mm. |
| gaze vector | Unit vector of the direction linking the center of the eye pupil and the fixation point. |
| gazed region of virtual screen | Region of the virtual screen containing the fixation points for all positions of the eye pupil within the union of the pupil ranges. It contains all the ipixels that can be gazed. |
| guard | Corridor between adjacent clusters of the digital display that contains no active opixels. The guard avoids optical cross-talk while guaranteeing a certain tolerance for the optics positioning. |
| human angular resolution | Minimum angle subtended by two point sources which are distinguishable by an average perfect-vision human eye. The angular resolution is a function of the peripheral angle and of the illumination level. |
| inactive area | Region of the digital display in which the opixels are inactive. |
| ipixel | Virtual image of the opixels belonging to the same web. Preferably, this virtual image is formed at a certain distance from the eye (from 2 m to infinity). It can also be considered as the pixel of the virtual screen seen by the eye. |

| | -continued |
|---|---|
| lenslet | Each one of the individual optical devices of the optics array, which collects light from the digital display and projects it to the eye sphere. The lenslet is designed to form a continuous image of opixels into ipixels. Each lenslet may be formed by one or more optical surfaces, either refractive or reflective. There is one lenslet per cluster and, in time multiplexing, one shutter (or equivalent) per lenslet. |
| open cluster | In time multiplexing, cluster whose lenslet has the shutter open. When there is no time multiplexing any cluster is an open cluster. |
| open lenslet | In time multiplexing, lenslet whose shutter is open. When there is no time multiplexing any lenslet is an open lenslet. |
| opixel | Physical pixel of the digital display. There are active opixels, which are lit to contribute to the displayed image, and inactive opixels, which are never lit. An inactive opixel can be physically nonexistent, for instance, because the display lacks at that opixel position at least one necessary hardware element (OLED material, electrical connection) to make it functional, or it can be unaddressed by software. The use of inactive opixels reduces the power consumption and the amount of information to be managed. |
| optical cross-talk | Undesired situation in which one opixel is imaged into more than one ipixel. |
| outer region of virtual screen | Region of the virtual screen formed by the ipixels that do not belong to the gazed region of virtual screen, i.e., it is formed by ipixels that can be seen only at peripheral angles greater than zero. |
| peripheral angle | Angle formed by a certain direction and the gaze vector. |
| pupil range | 1. Region of the eye sphere illuminated by a single cluster through its corresponding lenslet. When the eye pupil intersects the pupil range of a given lenslet, then the image corresponding to its corresponding cluster is projected on the retina. For a practical immersive design, a pupil range comprising a circle of 15 degrees full angle on the eye sphere is sufficient. 2. The union of all pupil ranges corresponding to all lenslets of the array. It is a spherical shell to a good approximation. If all accessible eye pupil positions for an average human are considered, the boundary of the union of eye pupil ranges is approximately an ellipse with angular horizontal semi-axis of 60 degrees and vertical semi-axis of 45 degrees relative to the front direction. |
| subframe slot | A time slot into which the frame period is divided. Subframe slots are called by an ordinal, i.e. first subframe slot, second, etc. |
| virtual screen | Surface containing the ipixels, preferably being a region of the surface of a sphere concentric with the eye and with radius in the range from 2 m to infinity. |
| web | Set of active opixels displaying information of the same ipixel during a subframe slot. |
| RXIR lenslet | Portion of the optical device in which light rays undergo (when going from the digital display towards the eye) at least four deflections in the following sequence: refraction, reflection, total internal reflection (TIR) and refraction. The first refraction and the total internal reflection may be performed by the same surface. The third deflection may be at a surface that is partly a TIR reflector and partly an opaque (e.g. metallized) mirror. |

3. State of the Art

Head mounted display (HMD) technology is a rapidly developing area. One aspect of head mounted display technology provides a full immersive visual environment (which can be described as virtual reality), such that the user only observes the images provided by one or more displays, while the outside environment is visually blocked. These devices have application in areas such as entertainment, gaming, military, medicine and industry. In US 2010/0277575 A1 there is a description of one of such devices. The basic optical function of a HMD is that of a stereoviewer such as the one described in U.S. Pat. No. 5,390,047.

A head mounted display consists typically in one or two displays, their corresponding optical systems, which image the displays into a virtual screen to be visualized by the user's eye, and a helmet that visually blocks the external environment and provides structural support to the mentioned components. The display may also have a pupil tracker and/or a head tracker, such that the image provided by the display changes according to the user's movement.

An ideal head mounted display combines a high resolution, a large field of view, a low and well-distributed weight, and a structure with small dimensions. Although some technologies successfully achieve these desired features individually, so far most technologies have been unable to combine all of them. That results in an incomplete or even uncomfortable experience for the user. Problems may include a low degree of realism and eye strain (due to low resolution or to poor optics imaging quality), failure to create an immersive environment (small field of view), or excessive pressure on the user's head (excessive weight).

First, PCT1 discloses concepts that are related to the present application, as clusters, opixels and ipixels. FIG. 1 of the present application, which was FIG. 3 in PCT1, shows a simple example with only four clusters 104t, 104b, 105t and 105b, which form the compound image created by opixels on the digital display 107. The opixels are projected in PCT1 by a lenslet array optics to form the image of ipixels on the virtual screen 108 (which for simplicity has been drawn here flat with a rectangular contour). Therefore, every opixel belongs to a single cluster and the intersection of any two clusters is the empty set and the union of all clusters is the whole digital display.

Each cluster displays a portion of the image on the virtual screen. Adjacent clusters display portions of the image with a certain shift that coincides in the neighboring regions. In order to explain why this is necessary, a two-dimensional schematic drawing has been added at the top of FIG. 1. It shows the relevant rays to define the edges of the mapping between opixels and ipixels. In this drawing, the virtual screen with the ipixels is placed at infinity, so the direction of rays 100a, 101a, 102a and 103a indicates the ipixel positions on the virtual screen. The drawing is two-dimensional for simplicity, but the actual device that projects the image on the bottom left in FIG. 1 is three-dimensional and contains four lenslets, two above and two below, and not only the two shown as 104 and 105 in the schematic drawing on the top of FIG. 1. The two-dimensional scheme is used to explain the horizontal coordinates of the mapping between opixels and ipixels, and an analogous reasoning applies to the vertical coordinates.

The horizontal extent of the virtual screen extends from 100a to 103a. The portion of the image represented in the left clusters 104t and 104b is given by the edge rays 100a and 102a reaching the edges of the pupil range 106, which define the vertical lines 100a and 102a on the virtual screen 108. Analogously, the portion of the image of represented in the right clusters 105t and 105b is given by the edge rays 101a and 103a, which define two vertical lines on the virtual screen 108. Therefore, the portion of the virtual screen 108 between 101a and 102a will be displayed in both left clusters and right clusters. Specifically, lenslet 104 maps edge rays 100a and 102a of the virtual screen onto 100b and 102b on the digital display 107. Analogously, lenslet 105 maps edge rays 101a and 103a onto 101b and 103b on the digital display 107. The optical design aims to guarantee that the clusters do not overlap, which is achieved with maximum use of the digital display when 101b and 102b coincide. The analogous alignment of top clusters 104t, 105t with bottom clusters 104b, 105b, is apparent from FIG. 1.

Because of the partial coincidence of the information on the clusters, ipixel ip1 is formed by the projection of four opixels, op11, op12, op13 and op14. This set of opixels is referred to as the "web" of ipixel ip1. Webs of ipixels located in the center of the virtual screen, such as ip1, contain four opixels each. However, webs of ipixels close to the boundaries of the virtual screen may have fewer opixels. For instance, the web of ipixel ip2 contains only two opixels, op21 and op22, and the web of ip3 contains only op31.

The devices disclosed herein do not use only refractive lenslets as the embodiments disclosed in PCT1, but a wedge-shaped prism optics with total internal reflection that allows rather long focal lengths (from 10 mm to 80 mm) while keeping the HMD with small dimensions.

Prior art using a wedge-shaped prism optics for HMDs has been proposed in the past, and multiple patents reflect it, although all of them share the same principle. Since the pioneer work was first presented by Morishima et al. in 1995, we will refer to all of them as Morishima's wedge-shaped prism optics. The fabrication and evaluation method were explored by Inoguchi. Following these pioneering efforts, many attempts have been made to design HMDs using free-form surfaces, particularly designs based on a wedge-shaped prism (U.S. Pat. Nos. 5,699,194, 5,701,202, 5,706,136. D. Cheng, et al., "Design of a lightweight and wide field-of-view HMD system with free form surface prism," Infrared and Laser Engineering, Vol. 36, 3 (2007).). For instance, Hoshi et al. presented a freeform prism offering a field of view of 34° and a thickness of 15 mm; and Yamazaki et al. described a 51° HMD design with optical-see though capability consisting of a wedge-shaped prism and an auxiliary lens attached to the wedge-shaped prism. More recently, U.S. Pat. No. 8,605,008 to Prest et al. includes a similar wedge-shaped prism optics. There are also several commercially available HMD products based on the wedge-shaped prism optics concept. For instance, Olympus released their Eye-Trek series of HMDs based on free-form prisms. Emagin carried Z800 with the optical module WFO5, Daeyang carried i-Visor FX series (GEOMC module, A3 prism) products; Rockwell Collins announced the ProView SL40 using the prism technology of OEM display optics. US 2012/0081800 A "Optical see-through free-form head-mounted display" by D. Cheng et al., also proposes a novel optical design for HMD applications, where particularly is presented a see-through free-form head-mounted display including a wedge-shaped prism-lens having free-form surfaces and low F-number.

The working principle of Morishima's wedge-shaped prism optics is shown in FIG. 3 (taken from U.S. Pat. No. 8,605,008 to Prest et al.), where 301 represents the eye, 302 is the digital display, and 303 is the lens. Rays 304 emitted by the digital display are first refracted by surface 305, then reflected by total internal reflection on surface 306, then reflected by mirrored surface 307 and finally refracted by surface 306 towards the eye.

However, Prest's lens is totally different from our embodiments since the order of the deflections is not the same. For instance, consider the case shown in FIG. 6 where the rays emitted by the digital display 608 undergo a refraction on surface 601, then a reflection on mirrored surface 602, a total internal reflection on surface 601 (or a reflection on the mirrored surface area 607), and finally a refraction on surface 603 to be sent to the eye 610. This different sequence of incidences allows the digital display of FIG. 8 to be placed in a rather vertical position in FIG. 6, while Morishima's wedge-shaped prism needs the display to be allocated rather horizontally (as shown in FIG. 3).

Another important difference between the embodiments disclosed herein and the previously mentioned prior art is that ours provides a very wide field of view (>60 degrees) even with a single display per eye, while the prior art achieves much smaller fields of view (<50 degrees) for a single display. One approach used in the prior art to increase the field of view is tiling, i.e., using multiple displays per eye arranged in a mosaic pattern, and not in the same plane. That approach is presented in D. Cheng et al., "Design of a wide-angle, lightweight head-mounted display using free-form optics tiling," Opt. Lett. 36, 2098-2100 (2011) and it is as shown in FIG. 4 (in which only a 2D vertical cross-section is presented, but in the real design, there are a total of up to 6 digital displays placed around the eye, as shown in FIG. 4c of Cheng). In contrast to that prior system which uses non-coplanar multiple displays per eye, in the presently disclosed devices, we use either a single display for both eyes, or a single display per eye, or several displays per eye but all them can lay in the same plane for easier mounting in a common PCB.

Other related prior art is disclosed in U.S. Pat. No. 7,689,116 to You et al., which consists in an optical design composed of a two-lenslet optics. This patent, applicable to a mobile camera, presents an optical lens system which divides the field of view into two using two separate symmetric off-axis refractive-reflective systems, thereby achieving a thinner mobile camera optical lens system.

FIG. 5 explains the basis of U.S. Pat. No. 7,689,116. In FIG. 5, the light emitted by the object (in the example, the flower 501) is transmitted through the optical system and impinges on the image plane, where a light sensor is placed 502. The light corresponding to the top half of the field of view enters the system through refractive surface 503, while the bottom half of the field of view enters the system through refractive surface 504. Both halves of the optical system are symmetrical, as shown in FIG. 5. The rays belonging to the top half are deflected successively by four different surfaces: first refracted on surface 503, then reflected on surface 507, again reflected on surface 508, then refracted by surface 509, and finally impinge on the top half of the image plane 502. Due to the particular optical architecture used in this device, each half of the image obtained on the image plane is inverted 505. This situation is corrected electronically, in order to finally obtain the desired image on the sensor 506.

Even though You's design is related with the embodiments disclosed herein as the one shown in FIG. 12, there are several important differences, which will be made clear by the disclosure in the detailed description below. First, the present embodiments are for a different purpose, i.e. head-mounted displays, while You's invention, shown in FIG. 5, is for a mobile camera optical lens. That requires a very different geometry. Second, You's real object (which is the scene to take the picture of) is located far from the lens, while our equivalent element (the digital display with opixels) is at a very short distance from the lens, even touching it. Third, You's image (projected onto the camera sensor) is real and is located very close to the lens, while our equivalent element (the virtual screen with ipixels) is virtual and is located far from the lens. Fourth, the output pupil in our case shown in FIG. 12 is real, is located on the exit side of the lens and is defined as the pupil range to allow for eye movements, while in You the equivalent pupil (which is the exit pupil) is virtual and is located at the entrance side of the lens. Fifth, the clear apertures of the two surfaces 503 and 508 in FIG. 5 are separated (no intersection between them), while in our case they are overlapped, actually being the same surface 1201 in FIG. 12 with two regions: a mirrored region, and a region that works by total internal reflection and refraction. Sixth, in You's system, (unlike the present embodiments), the mapping of ipixel to opixel is univocal, i.e. there are no webs, which is common to the multiaperture camera appearing in the state of the art of PCT1 (FIG. 1 and FIG. 2 of PCT1). And seventh, in You's system every ray generated by one pixel of the object goes to its corresponding one pixel of the image through a single lenslet, while in our case, there are many ipixels whose light comes from rays passing through more than one lenslet.

SUMMARY

In one aspect, a device for immersive virtual reality applications based on optical design has one or more lenslets to project the display light to the eye. There is at least one lenslet such that the light rays undergo at least four deflections on freeform surfaces in the following sequence in the direction of propagation from the display towards the eye: refraction, reflection, total internal or metallic reflection and refraction. The first refraction and the total internal reflection are performed by the same surface. This lenslet is called RXIR type herein. When multiple lenslets are used, the set of object pixels (opixels) of the digital display that are imaged onto image pixel (ipixels) of the virtual image through any one lenslet is called the cluster of that lenslet. In general, the opixel to ipixel assignation is not bijective, since several opixels belonging to different clusters may be mapped to the same ipixel of the virtual image.

There are multiple possible configurations of these embodiments depending on the number and type of lenslets. Preferred embodiments have either one, two or four RXIR lenslets, which can be alone or combined with refractive lenslets. These embodiments can be designed to be used with a single digital display for both eyes, one display per eye, or two displays per eye, and the digital display can be either flat or curved. The two RXIR lenslet embodiment can easily accommodate an eye tracking system using a small camera.

In an embodiment, the optical design is done using two or more freeform surfaces by multiparameter optimization of the coefficients of a polynomial expansion, preferably using an orthogonal basis. The design requirements are adapted to the human eye resolution for best utilization of the available degrees of freedom. This adaptation implies that the image quality of every ipixel should be a maximum when eye is gazing at or near to that ipixel (so the peripheral angle is small), since that ipixel will be imaged by the eye on the fovea, while the image quality is gradually relaxed when increasing the peripheral angles, where the eye resolving power decreases.

The addition of a time multiplexing technique allows increasing the number of ipixels by representing the image in several consecutive parts within the frame period and using all the available opixels for any of these image parts.

In an embodiment, the contrast of those embodiments is improved by including absorbers in several selected positions or with the help of a half-wave plate when polarized light is used (as in the case of an LCD digital display).

In another aspect, a display device comprises a display, operable to generate a real image. An optical system, comprising one or more lenslets, is arranged to generate a virtual sub-image from a respective partial real image on the display, by each lenslet projecting light from the display to an eye position. The sub-images combine to form a virtual image viewable from the eye position. At least one of the lenslets is such that the light rays from the display to the eye position are deflected sequentially at least four times by a refraction (R), a reflection (X), a total internal or metallic reflection (I), and a refraction (R) in that order (RXIR lenslet).

The display device may further comprise a display driver operative to receive an input image, and to generate the respective partial real images such that the resulting virtual sub-images align to form a virtual image of said input image as said viewable virtual image.

The first refraction (R) and the total internal or metallic reflection (I) may be performed by the same surface with non-coincident overlapping clear apertures. The region of overlap is then usually a region of both refraction and total internal reflection. Another region of the same surface that is outside the region of the first refraction may be metalized.

The one or more lenslets may comprise at least two of the RXIR lenslets, which may be superposable or different.

The one or more lenslets may comprise at least one of the RXIR lenslets and at least one lenslet that is a non-RXIR lenslet.

The at least one RXIR lenslet may then generate its virtual sub-image at a central portion of the viewable virtual image, and the at least one non-RXIR lenslet may then generate its virtual sub-image at a portion of the virtual image nearer to a periphery of the viewable virtual image. The RXIR lenslet(s), which typically provide the better imaging quality, are then used for the parts of the virtual image that are most likely to be viewed with the fovea.

At least two lenslets may be non-superposable.

The display device may be arranged to produce partial virtual images each of which contains a part projected by an eye onto a 1.5 mm region representing the fovea of the eye when the eye is represented by an imaginary sphere at the eye position of the display device with its pupil within the pupil range, the fovea part of each viewable virtual image having a higher resolution than a peripheral part of the viewable virtual image.

The optics may be placed at a distance from the imaginary eye sphere between 5 and 40 mm, the at least one lenslet forming an array of lenslets subtending a solid angle from the closest point of the imaginary sphere comprising a cone with 40 degrees whole angle, wherein the display is on a side of the optics remote from the imaginary sphere, at a distance from the optics of no more than 80 mm.

The respective partial real images on the display may comprise at least two partial real images that overlap on a same portion of the display and that are activated during different time periods, and wherein different lenslets image said same portion of the display to different sub-images at different positions of the virtual image.

The display device may further comprise a stray-light control system that removes light not contributing to the virtual sub-images.

The stray-light control system may comprise light-absorbent material in a part of the display device not crossed by light rays contributing to the virtual sub-images.

The stray-light control system may comprise a polarizer and a half-wave rotator arranged to absorb light reflected back towards the display.

An embodiment of a headgear comprises any of the above-mentioned aspects and/or embodiments of a display device, with a mount for positioning the display device on a human head with the eye position of the display device coinciding with an eye of the human.

The headgear may further comprise a second display device, mounted with the eye position of the second display device coinciding with a second eye of the human.

The displays of the first and second display devices may be parts of a single physical display.

In an embodiment, the RXIR deflections take place at surfaces of a solid transparent body that is longer in a direction towards and away from the eye position, or in a direction towards and away from the exit surface at which the second R refraction occurs, than in a direction perpendicular or transverse to that. As explained in an embodiment below, the solid body may be a pair of bodies, or one of a pair of bodies, that are separated only by a narrow low-refractive-index gap.

BRIEF DESCRIPTION OF DRAWINGS

The above and other aspects, features and advantages will be apparent from the following more particular description of certain embodiments, presented in conjunction with the following drawings. In the drawings.

DETAILED DESCRIPTION

The embodiments in the present invention include an optical device (per eye) that transmits the light from one or several digital displays to the area of the pupil range of the eye through one or more optical lenslets, where at least one of the lenslets is an RXIR lenslet, defined in the sense that the light rays of interest suffer (when going from the digital display to the eye) at least four deflections in the following sequence: refraction (R), reflection (X), total internal or metallic reflection (I) and refraction (R), whereas the first refraction (R) and the total internal or metallic reflection (I) are performed by the same surface with non-coincident overlapping clear apertures. (We call herein "surface" to a surface with first order continuity, that is, continuity of the slope, or higher). These embodiments use several freeform optical surfaces, which mean that they are surfaces which do not have the classical rotational or linear symmetries. Their design is done according to the detailed description given in section 8.

Embodiments of the present optical designs are unbalanced to optimize their degrees of freedom to image better the opixels whose image will be directly gazed by the eye (which will be focused on the fovea, where the human angular resolution is much higher), while the image quality corresponding to our peripheral vision is relaxed.

4. Embodiments with a Single RXIR Lenslet

Figure 6:
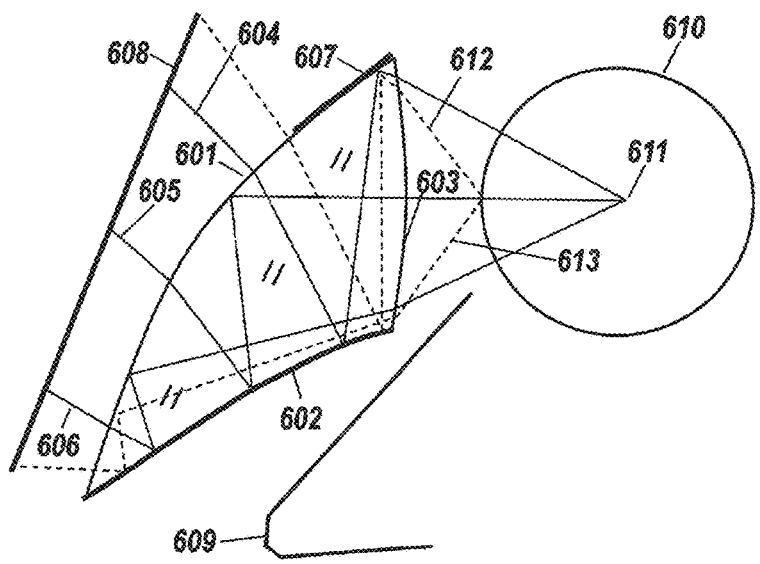
FIG. 6 is a cross section of a single RXIR lenslet embodiment for a large area digital display.

FIG. 6 shows the 2D lateral cross-section of a device with a single lenslet of the RXIR type, indicating the positions of the user's eye 610 and nose 609. The digital display 608 may be placed in a tilted position. This position of the digital display allows for a better mechanical coupling of the whole device to the user's face, especially adapted to the nose shape. As shown in FIG. 6, rays 604, 605 and 606 emitted by the digital display 608 undergo a refraction on surface 601, then are reflected on mirrored surface 602, again reflected, partly by total internal reflection on surface 601 and partly by metallic reflection at surface 607, where surfaces 601 and 607 form optically a single mirror, and finally refracted by surface 603 and directed towards the center of the eye sphere 611. These rays are therefore parallel to the gaze vector when the eye gazes its corresponding ipixel, and therefore the design is done to guarantee that the image quality for those ipixels is the highest. The rays 612 and 613 emitted from the edges of the display reach center of the eye pupil when it is resting frontwards, which delimits the edges of the field of view. A region of surface 601, indicated by 607, is metallized in order to perform the reflection of those rays not satisfying the total internal reflection condition, as for example ray 604 in FIG. 6. Of course this region, although it is part of surface 601, is not available as an entrance for rays coming from the digital display 608. Therefore, the clear aperture of surface 601 for the refraction and for the reflection overlap but they do not coincide. All three surfaces 601, 602 and 603 are preferably freeform, because breaking the classical rotational symmetry constraints provides more degrees of freedom in the optical design to guarantee the adequate image quality in the whole immersive field of view.

Figure 7:
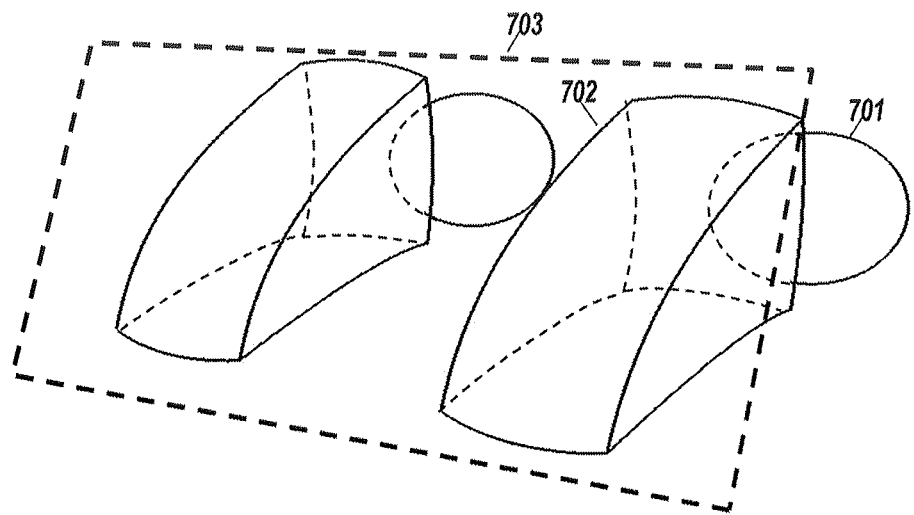
FIG. 7 is a perspective view of a single RXIR lenslet device with a single large area digital display for both eyes.

This design allows for using a single large digital display for both eyes or two half-size digital displays, i.e. one per eye. FIG. 7 shows the particular case of a single large display 703 for both eyes, where there are two lenses 702, one lens 702 for each eye 701. The digital display 703 is represented frontwards and, as explained in FIG. 6, it is tilted to have a better coupling with the user's face. This configuration is especially attractive for commercial digital displays made with low cost backplane technology of about 5 to 6 inches (125 to 150 mm) in diagonal, because this size implies that the longest side length is close to double the average human interpupil distance, which is about 63 mm.

This kind of lens, where there are one total internal reflection, two refractions and one reflection, can also be used in combination with one digital display per eye, instead of one large display for both eyes. This alternative decreases the digital display area and, consequently, the whole device cost. If we further reduce the size of the digital display, high cost backplane technology (as crystalline silicon ones of OLED-on-silicon, LCOS or DMD's) can be used cost-effectively. This is illustrated in FIG. 8.

Figure 8:
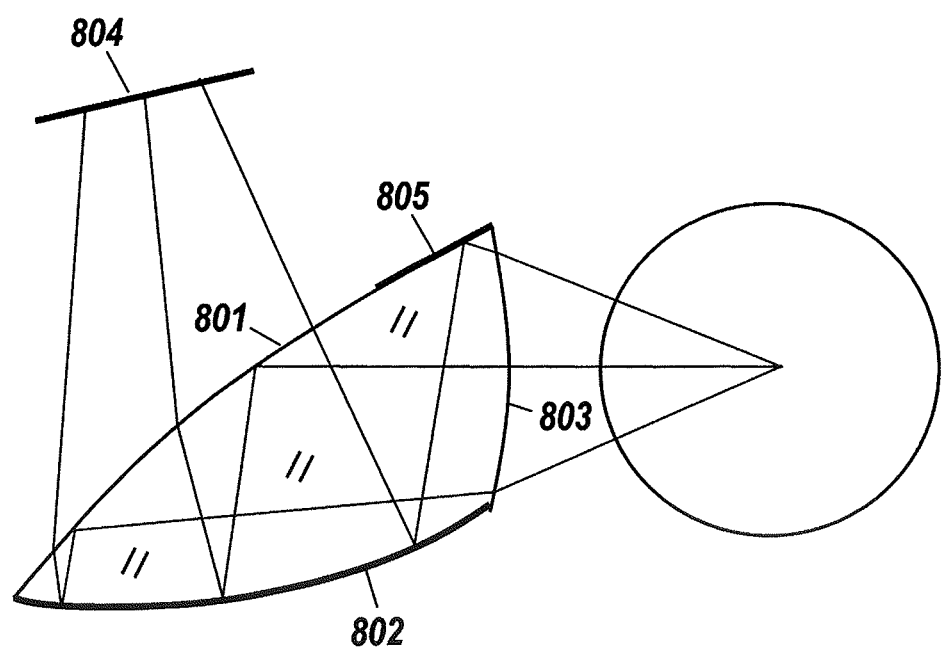
FIG. 8 is a cross section of a single-lenslet RXIR embodiment for a small microdisplay.
Figure 9A:
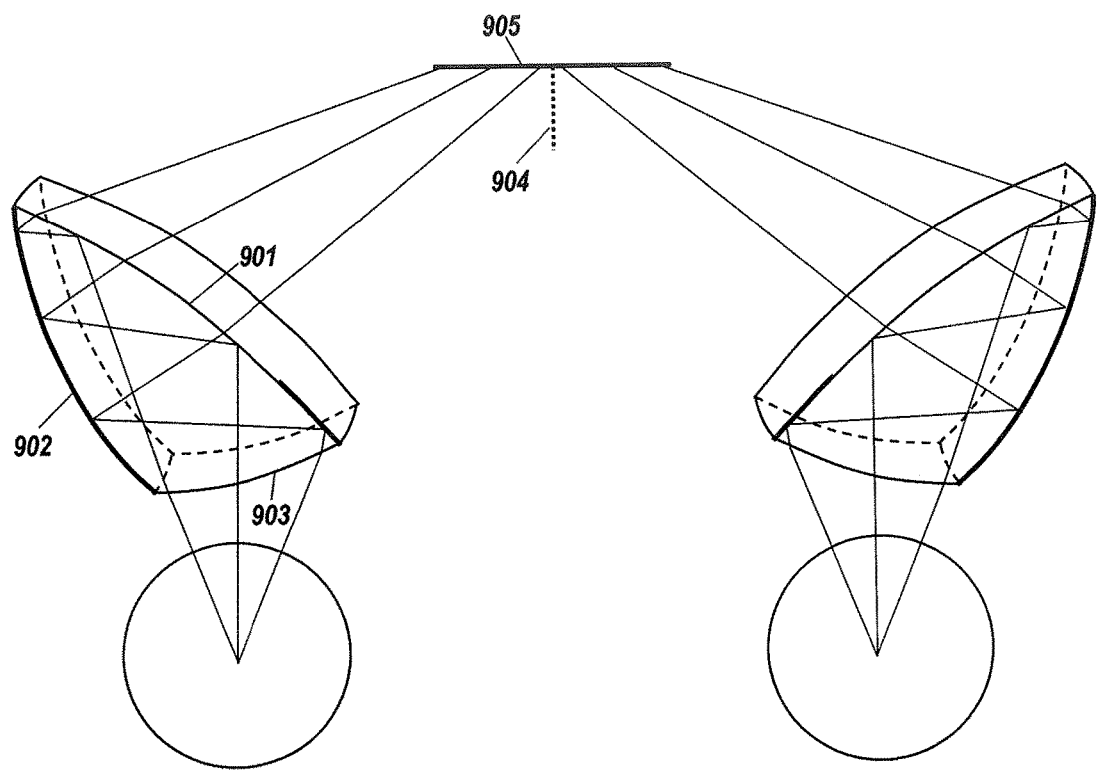
FIG. 9A is a top view of a single-lenslet RXIR embodiment with a single microdisplay for both eyes.

The design shown in FIG. 8 is for one lens and one digital display per eye. Nevertheless, a similar lens design, where there are two lenses but a single digital display for both eyes, can be obtained, and an example is shown in FIG. 9A, with a view of the whole device and both eyes from above. As shown in FIG. 9A, both lenses are similar to that in FIG. 8, but they are rotated in order to obtain the desired direction of the input/output rays. The digital display 905 emits rays, which are refracted by surface 901, reflected by surface 902, reflected by total internal reflection on 901 and finally refracted by 903 towards the left eye. The same behavior of the rays is shown in the right eye. Line 904 indicates one symmetry plane of the digital display and splits it into two regions: the left one, that sends light towards the left eye; and the right one, that sends light towards the right eye. In this way, this configuration can be designed for a 16:9 digital display, hence having two separated regions with 8:9 aspect ratio, one region corresponding to each eye. In the plane of symmetry 904, a flat absorbent surface can be added in order to avoid rays crossing the plane of symmetry and sending information to the wrong eye. When an LCD display is used as digital display, the backlight unit can be designed to emit directionally so the flat absorbent shield 904 is not needed. Analogously, a digital mirror device (DMD) can be used, and its illumination can be adjusted so the light is reflected in the desired directions.

Figure 9B:
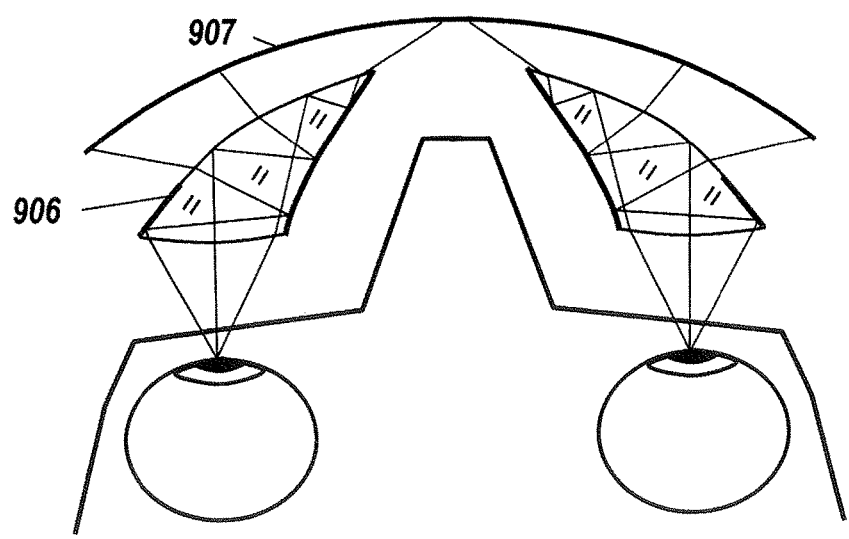
FIG. 9B is a horizontal cross-sectional view of a single-lenslet RXIR embodiment with a large area curved digital display.

FIG. 9B shows another variation of the same device 906 through 2D cross sections seen from above. The digital display 907 is designed to present a cylindrical configuration around the user's head. This alternative allows for an ergonomic and compact device, since the lateral parts of the digital display are closer to the face.

Figure 10:
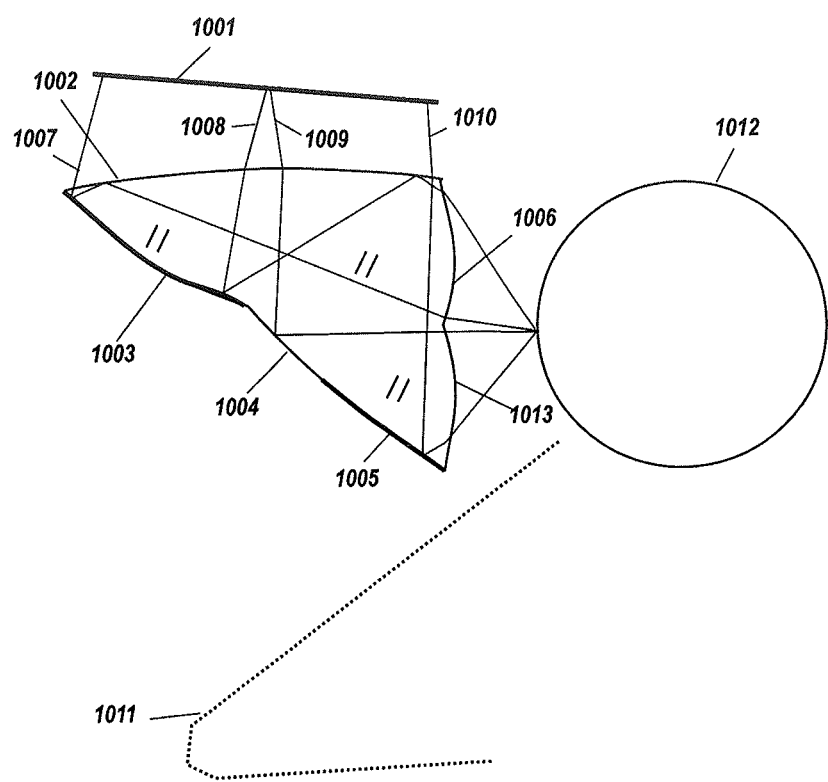
FIG. 10 is the cross sectional view of an embodiment with RXIR and RXR lenslets.

FIG. 10 shows a 2D vertical cross-section of another variant of the previously described embodiment. This one is formed by two lenslets, one of them RXIR-type, which can be recognized in FIG. 10 by the slope discontinuities of two of the surfaces (labeled with 1004 and 1006). With a multi-lenslet configuration such as this one, we may obtain more compact devices, in general at the expense of slightly smaller resolution because some image pixels (ipixels) are seen in more than one lenslet. Each lenslet images a certain part of the object. Often these image parts overlap. The object pixels (opixels) to image pixels (ipixels) mapping for a given lenslet is continuous but there is in general no such continuity between mappings of different lenslets. In order to get the complete continuous image on the retina, the digital display must then show a discontinuous picture, which, once imaged by the different lenslets, forms a continuous picture on the retina. In FIG. 10, rays labeled with 1007 and 1008 emitted by the digital display undergo a refraction on surface 1002, then reflection on metallized surface 1003, then once more these rays deflect on surface 1002 suffering total internal reflection and finally they are refracted on the upper lenslet of surface 1006 and directed towards the eye 1012. There are thus a total of 4 deflections through this lenslet, which is of the RXIR type mentioned before. Rays that belong to the other lenslet are illustrated in FIG. 10 with rays labeled as 1009 and 1010. These rays are refracted on surface 1002, then ray 1009 suffers total internal reflection on surface 1004 and ray 1010 is reflected on the metalized part of surface 1004 labeled as 1005, and afterwards both rays are refracted on the lower lenslet surface 1013 and directed towards the eye 1012, totaling three deflections, which could be labeled as RXR. Thus these two lenslets do not have the same optical configuration. All surfaces 1002, 1003, 1004, 1005 and 1006 are preferably freeform.

Alternatively, the device in FIG. 10 can be rotated 90 degrees with respect to an axis passing through the center of the eye and pointing frontwards, so the displays of the two eyes will be positioned generally vertically, one on each side of the head.

Figure 11:
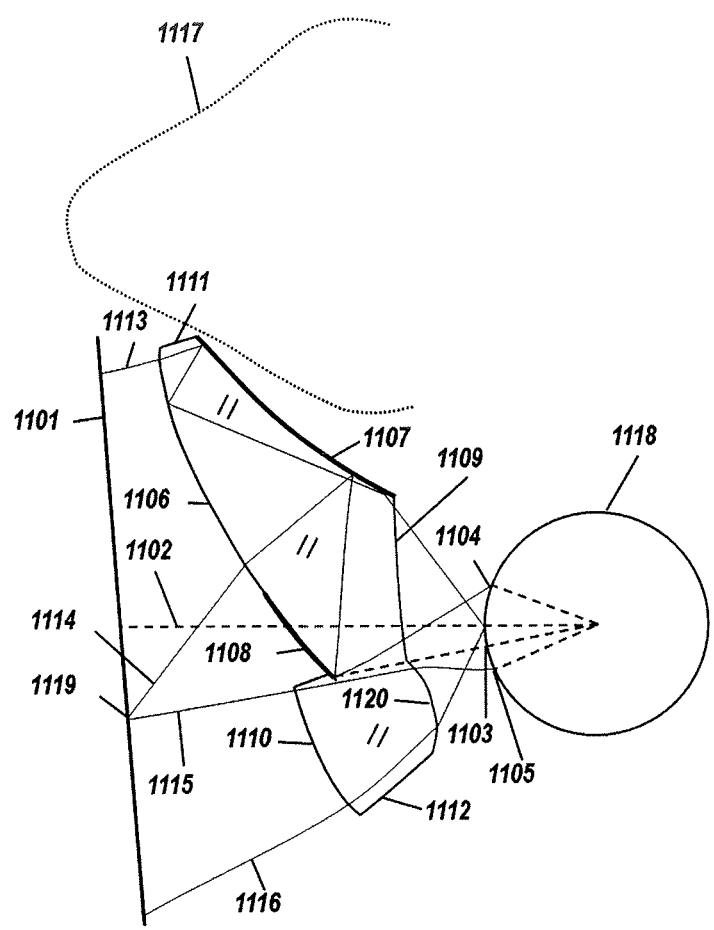
FIG. 11 is the cross sectional view of an embodiment with RXIR and RR lenslets.

FIG. 11 shows a top view of a horizontal cross section of another 2-lenslet configuration. User's nose 1117 and eye 1118 are shown for orientation purposes. Inner lenslet 1111 is RXIR-type and has front and back metallized parts labeled as 1108 and 1107, respectively. Outer lenslet 1112 is a lens that consists of 2 refractive surfaces (which could be therefore called RR with the same nomenclature) labeled as 1120 and 1110. This configuration works with the tilted display 1101 to provide a better ergonomics, and then it uses two interdependent digital displays, one per eye (e.g. digital display diagonal <2.2" (55 mm)). The inner lenslet 1111 is similar to that described in FIG. 6, while the outer lens 1112 is designed similarly to the lenslet designs described in Section 6.6 of PCT1. The digital display area that works with the outer lens lenslet 1112 is smaller in comparison with the inner digital display area that works with the inner lenslet. This is the case as the inner lenslet 1111 is designed for a wider fraction of the horizontal FoV and higher focal lengths.

Rays 1113 and 1114 that exit inner part of digital display 1101 shown in FIG. 11 are refracted at entrance surface 1106, reflected on back mirror surface 1107, totally internally reflected on the entrance surface 1106 (or reflected on the metallized part 1108 of surface 1106), refracted at surface 1109, and directed towards the eye 1118. Optical cross-talk between lenslets needs to be avoided. Therefore, ray 1114 starts its path in the inner cluster at the edge 1119 between the inner cluster and the outer cluster, propagates through lenslet 1111 and ends its path on the inner edge of the pupil range 1104. Ray 1115 starts its path in the outer cluster at the same edge 1119, propagates through lenslet 1112 and concludes its path on the outer edge of the pupil range 1105. Ray 1113 determines the inner border of the horizontal monocular field of view, it deflects near the inner border of exit surface 1109 and when traced backwards it ends near the inner border of digital display 1101. Ray 1116 determines the outer edge of the monocular horizontal field of view. It deflects near the outer edge of the exit surface 1120 and when traced backwards it ends near the outer border of digital display 1101. Rays 1115 and 1116 that exit outer cluster and suffer only two deflections—they refract on surface 1110, refract on surface 1120 before reaching the eye.

For simplicity, a 2-lenslet configuration was chosen to be shown in FIGS. 10 and 11, although the number of lenslets may be substantially bigger. Particularly interesting is a 2×2 configuration such that the two top lenslets are RXIR type and the two bottom lenslets are RXR and RR for FIG. 10 and FIG. 11, respectively. These options include more than one RXIR lenslet, and therefore could be consider embodiments belonging to the next sections.

5. Embodiments with Multiple Superposable RXIR Lenslets

Figure 12:
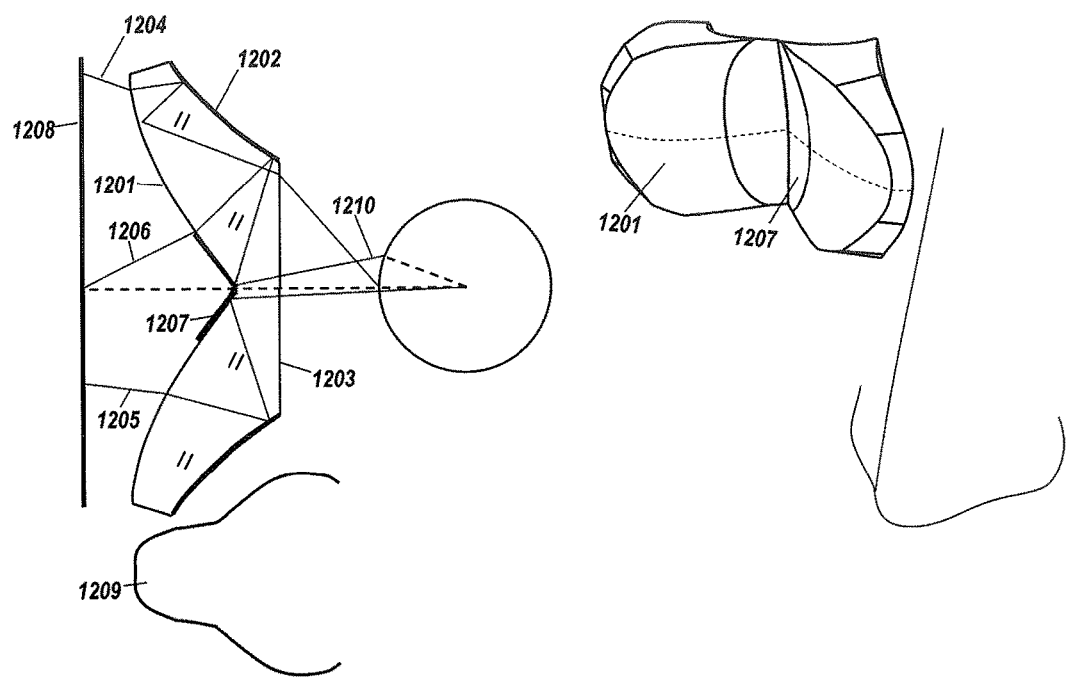
FIG. 12 is a cross sectional view and a perspective view of a 2-fold embodiment with two RXIR lenslets.

Another preferred embodiment, shown in FIG. 12, is a variation of the design shown in FIG. 6 with two superposable RXIR lenslets instead of one. "Superposable" here means that a rigid motion (rotation, reflection, and/or translation) of a lenslet can make it identical to the active area of another lenslet. The principles disclosed here do not require such symmetry, as will be disclosed in the next section, but symmetry or superposability simplifies the design, manufacturing, mounting and testing.

FIG. 12 shows the cross section of a 2-fold design with a top view of the device and the user's head, indicating the position of the nose 1209. In this 2-fold configuration, the long side digital display 1208 is placed in a rather vertical position, unlike the tilted position of the digital display in FIG. 6. The design usually requires the digital display 1208 to be divided into two clusters, one for each of the upper and lower lenslets in FIG. 12. The physical display 1208 can then be divided into two separate displays, one per cluster, preferably but not necessarily coplanar, which adds degrees of freedom to the design. Rays 1204, 1205 and 1206 undergo a refraction on surface 1201, then a reflection on mirrored surface 1202, a reflection on surface 1201, and finally a refraction on surface 1203 to be directed towards the eye. While the second reflection is performed by total internal reflection in the case of ray 1204, in the cases of rays 1205 and 1206 it is performed by the mirrored portion of surface 1207. Again, these surfaces are freeform.

Optical cross-talk needs to be avoided by the definition of a pupil range (as was done in PCT1) so the edge ray 1210 of the pupil range impinging at the edge of surface 1201 is sent as 1206 to the cluster edge. The need for the pupil range to be included in the edge region of each partial virtual image requires the virtual images to overlap slightly. Therefore, the region of overlap must be duplicated in both clusters on the digital display. Therefore, the overall display resolution is slightly reduced compared to what is theoretically available with a single lenslet using the whole digital display as a single cluster. The optimization of the freeform profiles of this 2-fold symmetric design (as detailed below in section 8, "Detailed example of a 2-fold superposable optics") tends to lead to a refractive surface 1203 which is convex in the direction perpendicular to the plane shown in FIG. 12.

Figure 13:
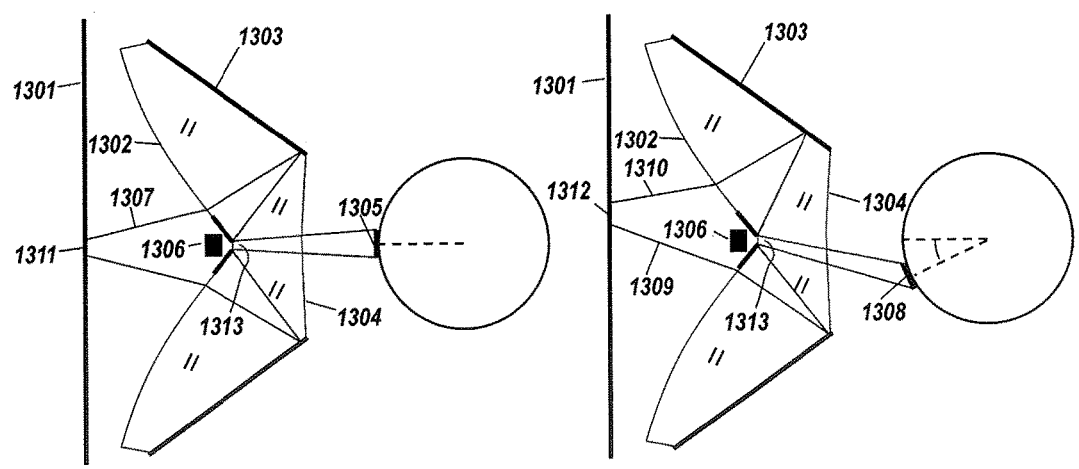
FIG. 13 is a schematic diagram of the added camera for eye-tracking.

FIG. 13 shows how a system to track the eye pupil position can be added. An eye pupil tracking system is able to detect the eye pupil position, which allows the display device to modify dynamically the information displayed on the digital display, showing information to the user related to the part of the field of view towards which the user is gazing. Additionally, the clusters are real-time adjustable in order to avoid optical cross-talk among different lenslets, while reducing the overlap needed between the different partial images. A camera 1306, preferably based on a small CMOS sensor, gets an image of at least the pupil range through of a small pin-hole 1313 placed in the intersection of the two lenslets close to the edge of surface 1302. The pinhole 1313 is small enough (about 1 mm diameter) to make it not noticeable to the user. Camera wires (and, if needed, holder) can be located perpendicular to the plane of FIG. 13, using the volume that is not crossed by any ray in this design. On the left side of FIG. 13, the gaze vector direction is pointing frontwards, showing the digital display 1301, the first refraction of the rays on surface 1302, then reflection on mirrored surface 1303, then reflection on surface 1302 and finally refraction on surface 1304. FIG. 13 shows the extreme reversed rays coming from the edges of the eye pupil 1305. On the right side of FIG. 13, we show the eye pupil 1308 at the extreme of the pupil range and reversed rays 1309 and 1310 are the edge rays of the eye pupil. In both situations (eye looking frontwards and maximally rotated) none of the rays are blocked by the camera 1306, which is hidden behind the metallized region of surface 1302, and the separation between the clusters changes from 1311 to 1312 when the pupil moves from one situation to the other.

Figure 14:
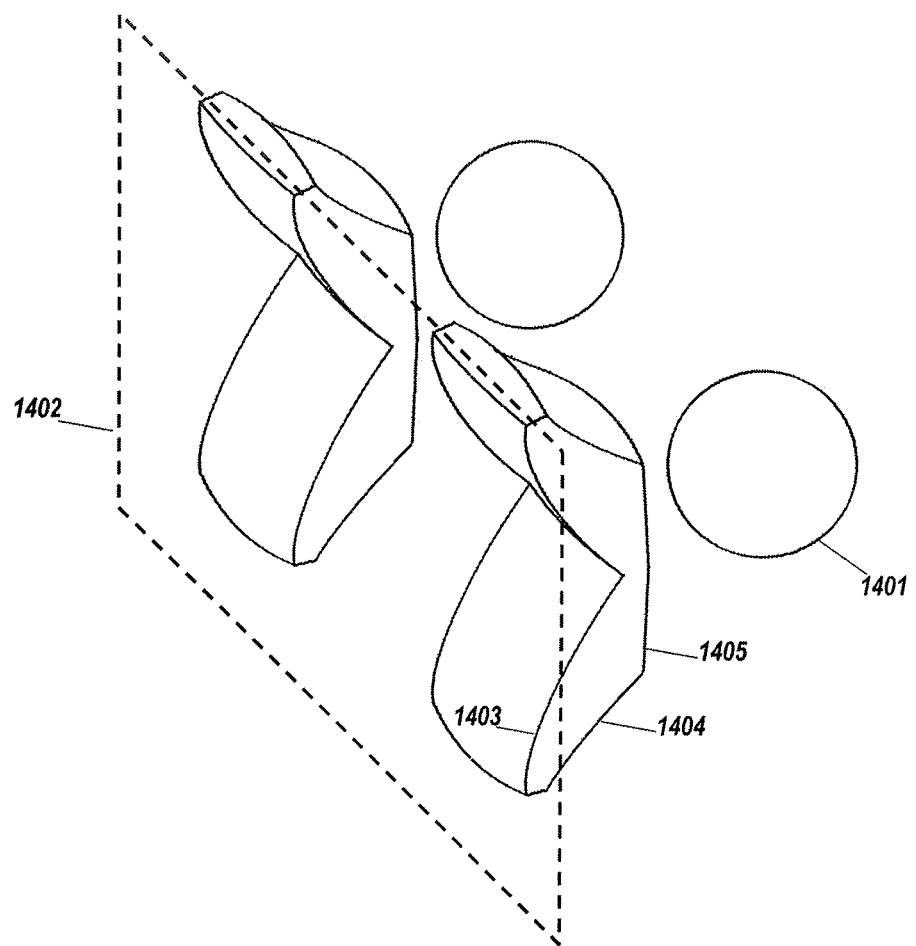
FIG. 14 is a perspective view of an embodiment with two RXIR lenslets per eye and a single digital display for both eyes.

FIG. 14 shows a device similar to the one in FIG. 12, but rotated 90° with respect to an axis pointing frontwards passing through the center of each eye sphere. This orientation of the lens allows for a configuration where both lenses work with a single standard 5.7" (145 mm) diagonal display, as shown in FIG. 14. Light emitted from the digital display 1402 is deflected by surfaces 1403, 1404 and 1405 of the lenses, and finally arrive to the eyes 1401.

Figure 15:
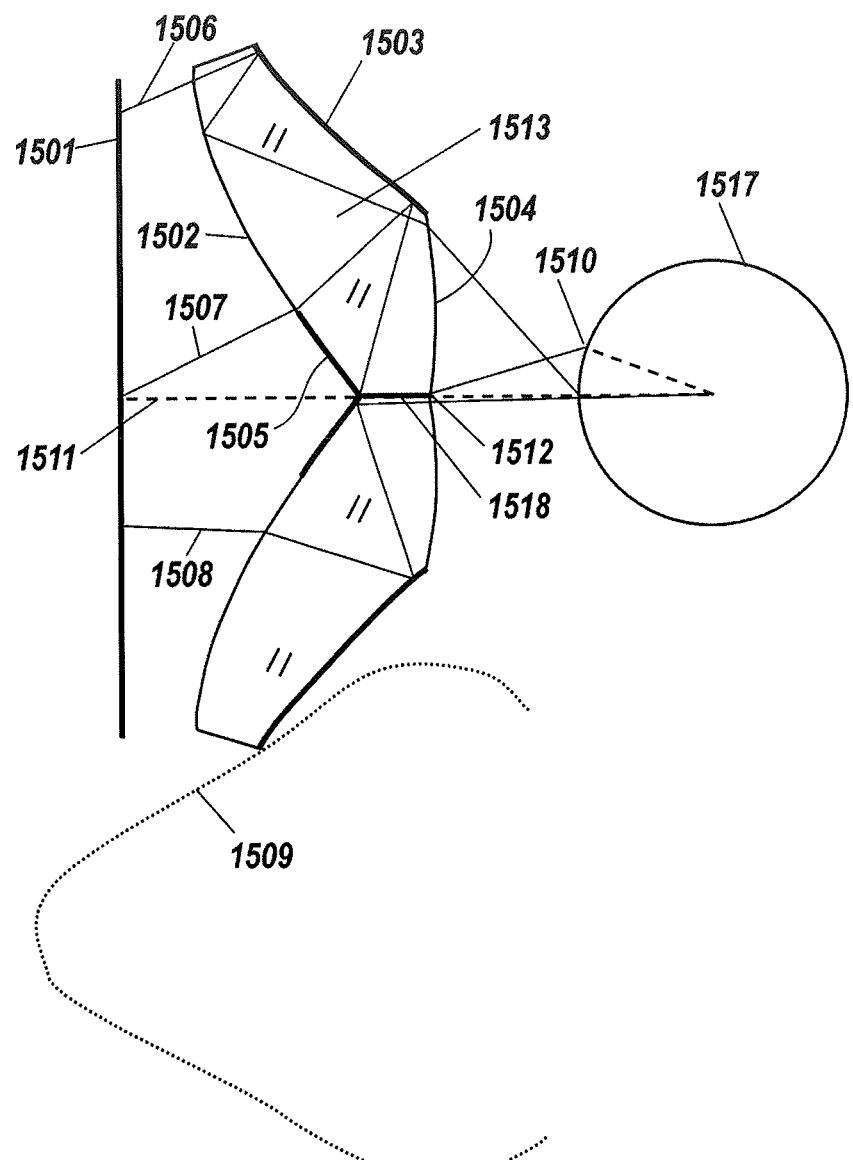
FIG. 15 is a cross section of an embodiment in which the two RXIR lenslets are manufactured as separate pieces.

FIG. 15 shows another possible configuration which consists in a 2-fold lens design with a cusp 1512 on exit surface 1504 (thus creating two exit surfaces, one for each lenslet). This configuration is interesting to manufacture two lenslets independently and make them operate without the optical cross-talk. This design principle may be applied to k-fold lens configurations, where k>1. FIG. 15 shows a top view of the device's horizontal cross-section and the user's head, indicating the position of user's nose 1509 and eye 1517. The profile shown in FIG. 15 is similar to the 2D profile shown in FIG. 12, with a difference that the FIG. 15 embodiment consists of 2 pieces that meet along the face 1518. The digital display 1501 is placed for this 2-fold configuration in the same position as in FIG. 12. Rays 1506 and 1507 undergo a refraction on surface 1502, then reflection on mirrored surface 1503, total internal reflection in case of ray 1506 or reflection in case of rays 1507 on metalized part 1505 of surface 1502, and finally refraction on surface 1504 to be directed towards the eye 1517 (similarly for the ray 1508). Surfaces 1502, 1503 and 1504 are freeform. A difference from the design without cusp in FIG. 12 appears on the exit surface at the point of the trajectory of the extreme ray 1507 that defines a pupil range, since optical cross-talk needs to be avoided. Ray 1507 comes from the cluster edge, and after refraction on the inner border of the refracting part of surface 1502 and after reflections on edges of surfaces 1503 and 1505, it is reflected parallel to the optical axis 1511, refracted on the cusp edge of exit surface 1504 and directed towards the pupil range edge labeled as 1510. This is the extreme ray of the pupil range.

Figure 16:
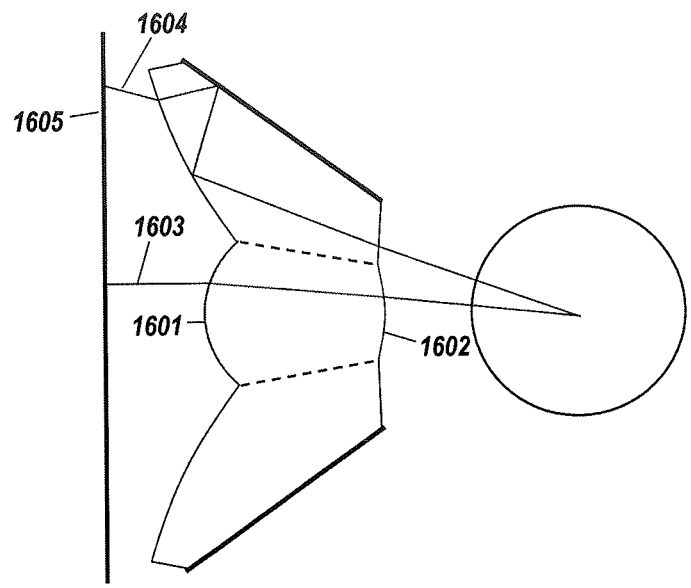
FIG. 16 is a cross section of an embodiment with one central RR lenslet and two peripheral RXIR lenslets.

FIG. 16 shows the 2D cross section of a 5 lenslet device, where the section only shows 3 lenslets, separated by dashed lines (FIG. 16 is valid for a 3-fold configuration as well). The extreme lenslets are analogous to those shown in FIG. 12, and in this way, ray 1604 behaves in a similar way to ray 1204. On the other hand, the rays going through the central lenslet, e.g. ray 1603, undergo a refraction on surface 1601 and another refraction on surface 1602, and the profiles of the central lenslet can be rotationally symmetric. In the embodiment shown in FIG. 16, the outer lenslets may be superposable by rotation about the central axis, but that is not required in the more general case. As before in the 2 lenslet case, optical cross talk needs to be avoided by the definition of a pupil range as was disclosed in PCT1.

Figure 17:
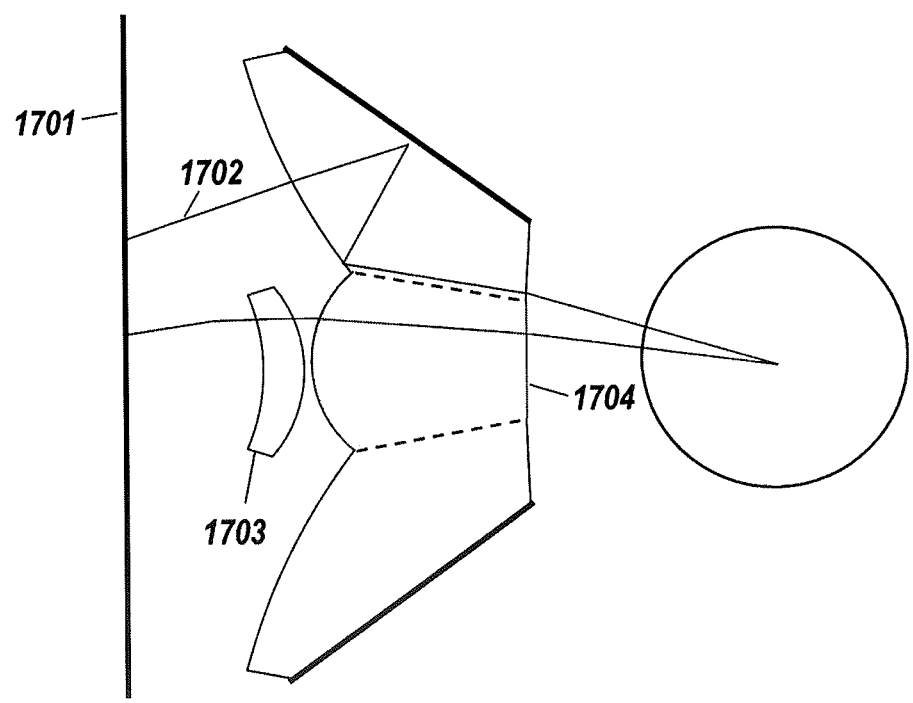
FIG. 17 shows a variation of the design in FIG. 16 in which a lens has been added to the RR lenslet.

FIG. 17 shows a variation of the design shown in FIG. 16, in which an extra refractive lens 1703 is introduced to deflect rays transmitted through the central lenslet. This extra lens allows the output surface of central lenslet 1704 to be flat, hence also allowing the surface closest to the eye to be continuous and differentiable (with no cusp) along the three lenslets. We now have three design surfaces for the central lenslet, thus being able to have good image formation and to control the focal length of the optical design (at the same time that we do not have cusps on the surface near the eye).

Figure 18:
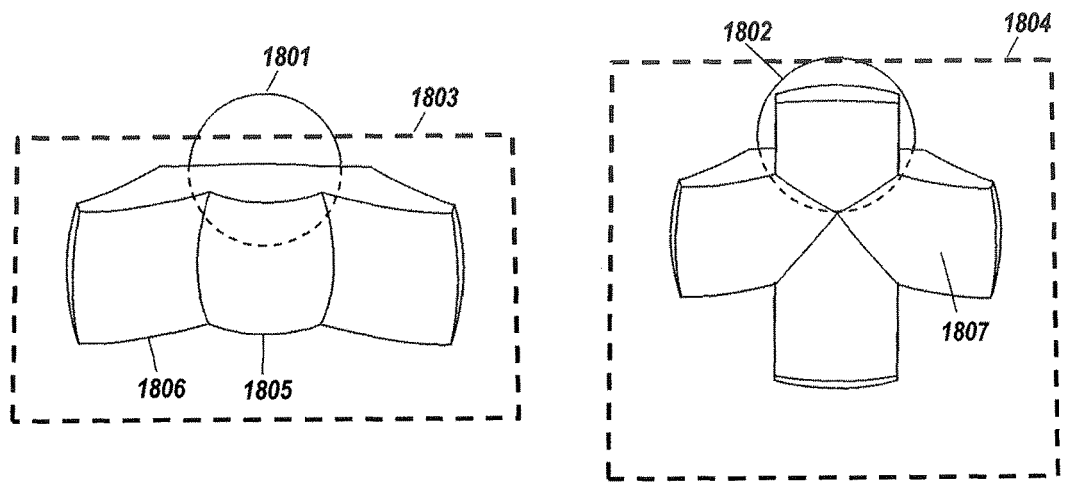
FIG. 18 shows perspective views of the embodiment of FIG. 16 and of a 4-fold RXIR embodiment.

FIG. 18 shows 3-lenslet (left) and 4-lenslet (right) designs in 3D. In both sides of FIG. 18, a single eye is plotted on the background, as 1801 and 1802, respectively. On the other hand, the digital display has been plotted frontwards with dashed lines, and is represented by 1803 and 1804 respectively. Notice that the 3 lenslet design is more suitable for rectangular digital displays, e.g. 16:9 ratio, while 4-lenslet designs are more suitable for square-shaped digital displays. The 3-lenslet design presents two different lenslets, from the optical design point of view: one design for the central lenslet 1805, and one design for the two outer lenslets 1806. On the other hand, the 4 lenslet design presents only one kind of.

Figure 19:
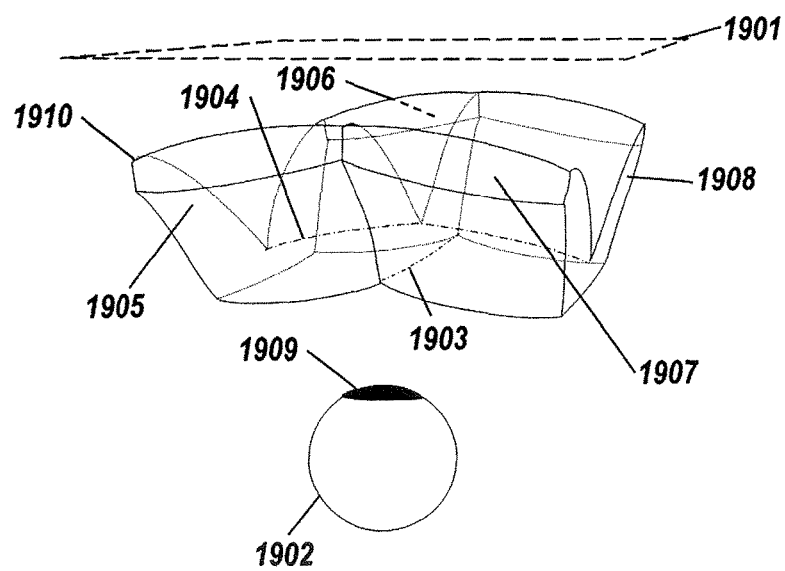
FIG. 19 is a perspective view of another 4-fold embodiment.

FIG. 19 shows a perspective view of the device 1910 for one eye, which is a 4 lenslet variant of the 2 lenslet device in FIG. 12. We use this configuration to prevent excessive chromatic aberration for a given field of view caused by convex curving of surface (2005), which may result from the freeform surface optimization. This 4 lenslet configuration may be based on the 2 lenslets with cusp previously described with reference to FIG. 15 as well. Four lenslets of device 1910 are shown and labeled as 1905, 1906, 1907 and 1908. Half of the digital display 1901 that works with lens 1910 is shown. FIG. 19 shows dash dot lines 1903 and 1904 along which the first derivatives (slopes) of the closest surfaces to the eye and to the displays, respectively, are discontinuous (these lines separate surfaces that belong to different lenslets). The optical cross talk between each two adjacent lenslets is avoided in both cross-sections shown in FIG. 19.

Figure 20:
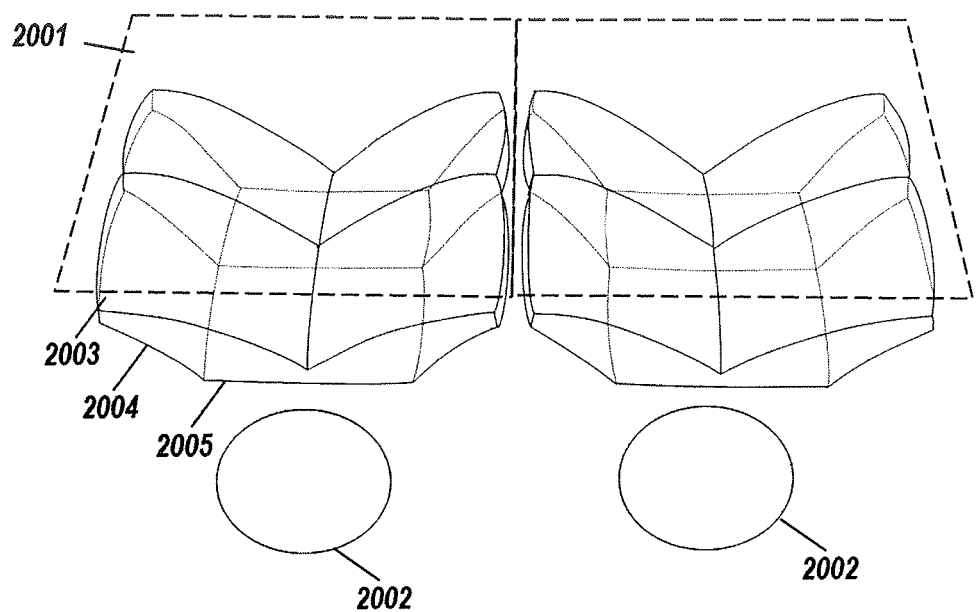
FIG. 20 shows the embodiment in FIG. 19 applied to a single digital display for both eyes.

FIG. 20 shows a 3D illustration of the same configuration as in FIG. 19 with two 4-lenslet devices (one per eye, metallized parts are omitted for drawing clarity) that work with a single standard digital display (preferably 16:9) labeled as 2001. We may appreciate clearly from FIG. 20 that the device placed in front of each of the two eyes 2002 has 4 lenslets, each lenslet consists of refractive surface 2003 closest to digital display 2001, reflective surface 2004 and refractive surface 2005 closest to eye 2002. The digital display 2001 sends light, which is refracted by surface 2003, reflected by surface 2004, totally internally reflected again on surface 2003, refracted on surface 2005, and finally reaches the eye 2002. Each lenslet is individually not symmetric, but the lenslets are symmetric with each other with respect to reflection in the planes that separate the lenslets when the digital display 1901 is flat. When a cylindrical display is used, so the short side of the display 2001 in FIG. 20 is curved, such symmetry would still be preserved.

Figure 21:
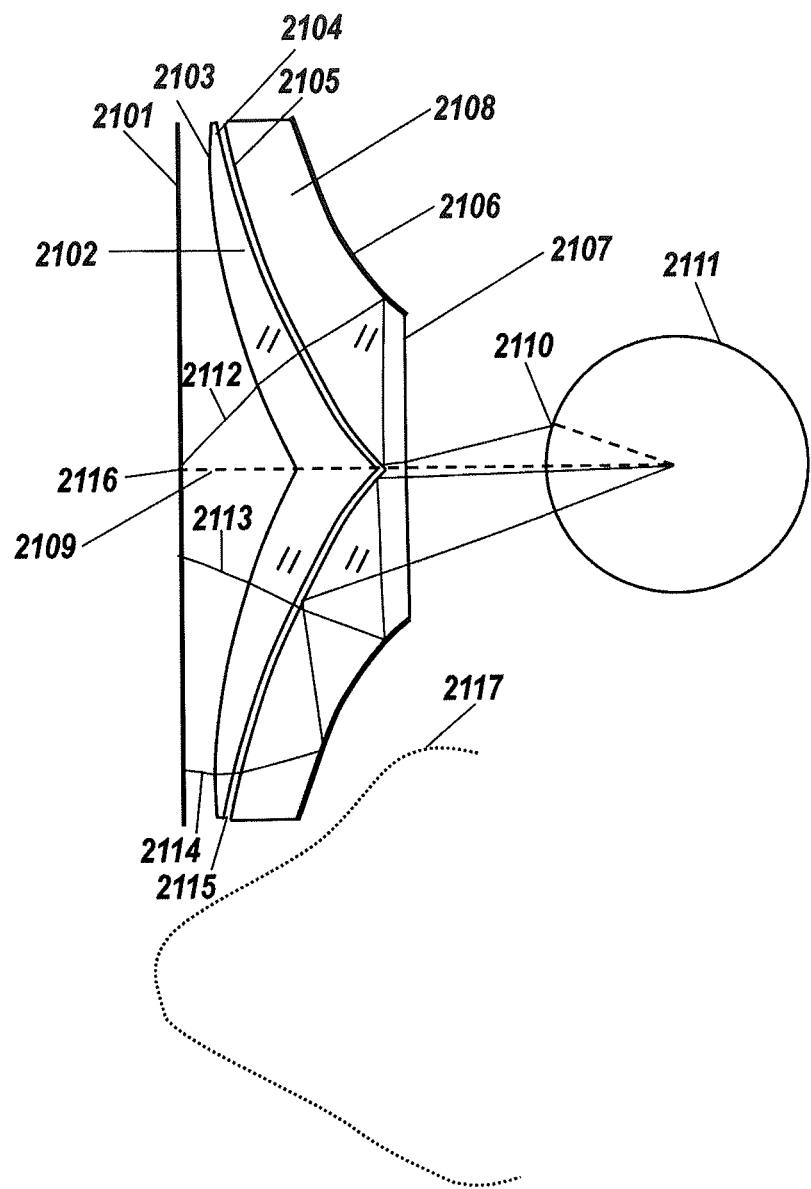
FIG. 21 is a cross-sectional view of an embodiment with an additional lens close to the display.

FIG. 21 illustrates another embodiment with superposable lenslets showing the horizontal cross-section of the device. The user's eye and nose are also shown labeled as 2111 and 2117, respectively. This device consists of two separate dielectric pieces 2102 and 2108 separated by an air gap, or alternatively filled with a low index material, for example, a fluoropolymer like fluorinated ethylene propylene (FEP). This new lens 2102 placed in front of digital display 2101 provides one more optical surface to design and so provides additional degrees of freedom. Exemplary ray 2112 emitted by digital display 2101 is refracted on the entrance surface 2103, and on surface 2104 where it enters the low index gap 2115. Ray 2112 is refracted on surface 2105 where it leaves the low index gap and enters another lens piece 2108. Then ray 2112 is reflected on metallized surface 2106, deflected by total internal reflection (or metallic reflection) on surface 2105 that is used for second time, refracted on exit surface 2107 and finally reaches the eye 2111. Rays 2113 and 2114 have similar trajectories. Ray 2112 starts its path on the cluster edge 2116 and concludes its path on the border of the pupil range 2110. Ray 2113 forms a small exit angle with the optical axis 2109 and ends in the eye sphere center. Ray 2114 exits digital display 2101 near the border of the display and after passing through lenses 2102, 2108 points towards the eye sphere center, passing through the border of the pupil range. In this configuration, surface 2105 and its symmetric counterpart are used twice (by refraction and by total internal reflection).

The use of either a single large digital display for both eyes, or two separated digital displays, i.e. one per eye, is also possible in the embodiment of FIG. 21.

Figure 22:
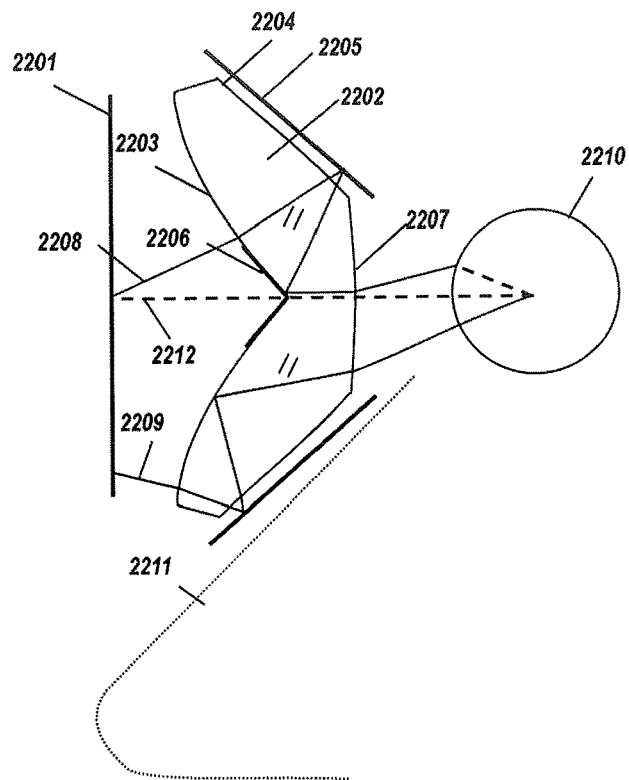
FIG. 22 is a cross-sectional view of an embodiment using a flat mirror decoupled from the dielectric piece.

A vertical cross-section of another device configuration is illustrated in FIG. 22, where human eye is 2210 and nose is 2211. In this design, instead of the back mirrored lens surface we use a separated mirror 2205 for each lenslet behind the back lens surface 2204. In this way, we avoid back surface metallization and we may use separate flat or freeform mirrors. Rays 2208 and 2209 emitted by digital display 2201 are refracted on the entrance surface 2203, then they exit the dielectric piece 2202 after refraction at the back surface 2204, pass through the air gap and are reflected on the flat mirror 2205. Then rays re-enter lens 2202 by refraction at the same back surface 2204, they reflect on metallized part 2206 or are reflected by total internal reflection on surface 2205, refract at exit surface 2207 and finally reach the eye 2210. The surface 2204 can be anti-reflection (AR) coated to avoid double images caused by Fresnel reflections. Exemplary ray 2208 starts its path on the digital display 2201 cluster edge and concludes its path on the border of the pupil range. Exemplary ray 2209 exits digital display 2201 near the border and exits the lens near the border of exit surface 2207 after which it passes through the border of the pupil range in a direction towards the eye sphere center. FIG. 22 shows an example of a 2-lenslet configuration, but may be extrapolated to a design with k lenslets, k>2. Another variant of this configuration is 90° rotation around the dashed line axis 2212.

Figure 23:
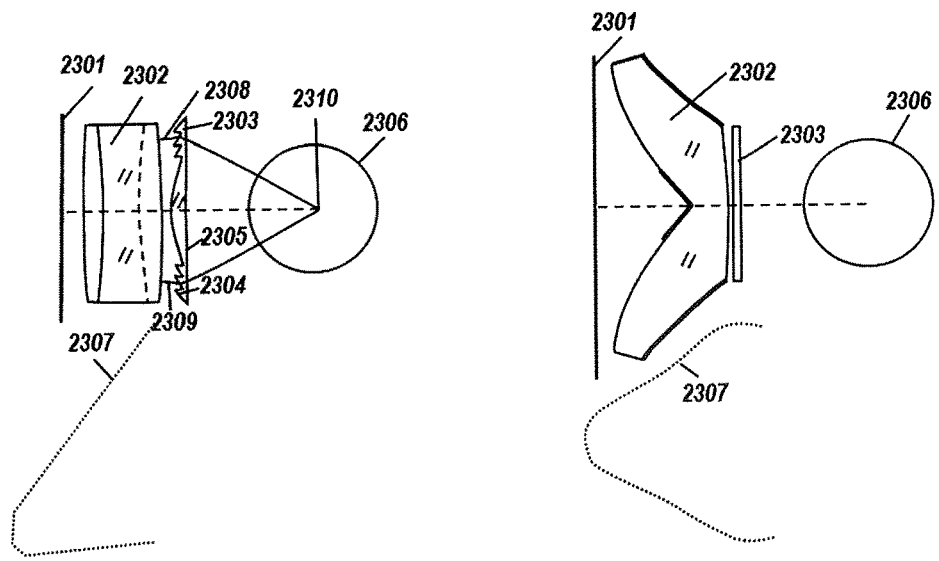
FIG. 23 shows cross sectional views of an embodiment with an additional lens close to the eye.

Next configuration in FIG. 23 includes also two separate optical pieces, with a thin lens 2303 such as a thin Fresnel lens placed between a device 2302 similar to that in FIG. 12 and user's eye. In order to solve the issue of excessive convex curving of surface 1203 of 12 in the direction perpendicular to the plane of FIG. 12, FIG. 23 includes a lens 2303 with positive optical power in that direction between the optical device 2302 and the human eye 2306. In FIG. 23, this lens 2303 is a Fresnel lens, which is a thin lens so it will not significantly increase the overall system thickness. FIG. 23 right shows a top view of a horizontal cross-section of this configuration and FIG. 23 left shows a side view of the vertical cross-section of the same configuration. FIG. 23 shows a user's eye 2306 and nose 2307 for orientation purposes. A digital display 2301 is placed in a vertical position. The use of either a single large digital display for both eyes, or two separated digital displays, i.e. one per eye, is allowed in this design.

Different lenses 2303 can be designed for a given device 2302 to correct the user's vision defects (for example, myopia, hypermetropia or astigmatism) by changing correspondingly the virtual screen in the design. Thus, only lens 2303 needs to be reassembled to accommodate different users.

Rays in this configuration suffer two additional refractions in comparison with the systems that consist of lens 2302 alone. Rays exiting lens 2302 suffer one refraction on faceted surface 2304 of Fresnel lens 2303 and the other refraction on plane exit surface 2305. As shown in FIG. 23, surface 2304 has facets only in one direction (see left side of FIG. 23), i.e., the grooves may have cylindrical symmetry along the vertical direction, which makes for easier manufacturing. This is why the facets are not seen in the right side of FIG. 23. Fresnel lens 2303 placed at the exit of lens 2302 concentrates rays 2308 and 2309 when they exit the lens 2302 towards the eye sphere center 2310.

As mentioned above, Fresnel lens 2303 may be substituted with another lens, either linear symmetric, rotationally symmetric or freeform.

Figure 24:
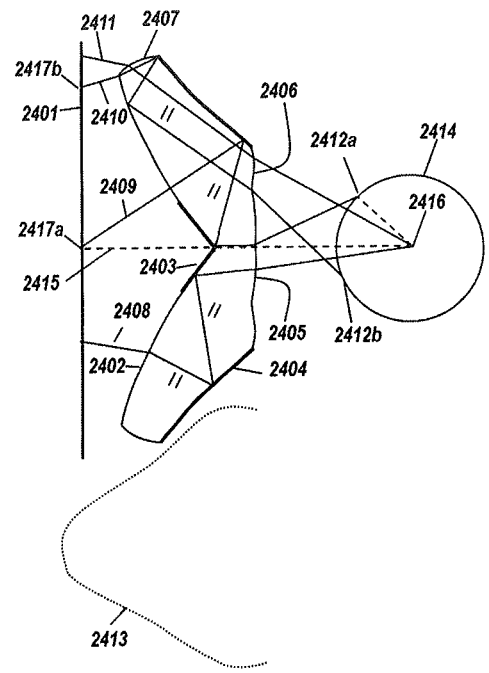
FIG. 24 is a cross sectional view of another embodiment with two central RXIR lenslets and two peripheral RR lenslets.

FIG. 24 shows a top view of a horizontal cross section of another device. User's nose 2413 and eye 2414 are shown for orientation purposes. This design has four lenslets: two of them are RXIR type and the other two are refractive RR type, and allow for a shorter display to eye distance than the embodiment in FIG. 12. Therefore, this device has four clusters of opixels in the digital display. The inner lenslet in each pair of lenslets preferably covers the pupil range where the eye usually gazes, for instance, the horizontal angular range from 0° to 20° measured at the eye sphere center 2416 relative to the front direction 2415, which it is therefore the region where we need higher image quality. Rays that belong to the inner lenslets suffer 4 deflections. The outer lenslet consists of two refractive surfaces 2406 and 2407 where rays suffer only two deflections. This lenslet covers a narrower angular range, for instance, from 20° to 30° measured at the eye sphere center 2416 relative to the front direction 2415; and this range is rarely gazed by the eye. We illustrate the working principle of this embodiment in FIG. 24. This device can work with the vertical display 2401, so we may have one large digital display for both eyes or two smaller digital displays per eye (i.e., digital display diagonal <2.5" (60 mm) approximately).

FIG. 24 shows different surfaces. The refractive entrance surface 2402 (and its mirrored portion 2403), the mirrored surface 2404 and the refractive exit surface 2405 belong to the inner lenslet. The refractive surfaces 2406 and 2407 belong to the outer lenslet. The exit surfaces 2406 and 2405 of the same side are usually separated by a small slope discontinuity. Focal distances are preferably distributed in order to have a maximum in a frontward direction along axis 2415, and then they gradually decrease when moving away from the center of the virtual screen, as discussed in detail below in the next section 7. The outer cluster of the digital display (which extends from point 2417*b* to the display outer edge) that works with the outer RR lenslet is smaller than the cluster (which extends from point 2417a to 2417b) that operates with the inner RXIR lenslet because the inner cluster covers a wider angular range and has higher focal lengths.

Ray 2408 exiting the digital display is refracted on surface 2402, reflected on back mirror surface 2404, totally internally reflected on the entrance surface 2402 (or reflected on the mirrored part 2403 of surface 2402), refracted on surface 2405 and directed towards the eye 2414, undergoing a total of 4 deflections. Rays 2409 and 2410 suffer the same deflections. Ray 2409 starts its path on the inner edge 2417a of the cluster extending from point 2417a to 2417b and ends on the outer edge of the pupil range 2412a. Ray 2411 works with the outer RR lenslet, it exits digital display inside the outer cluster and suffers two deflections, one refraction on surface 2407 and another one on surface 2406, after which it is directed towards the eye in the gaze vector direction (i.e., approximately to the eye sphere center 2416). Ray 2410 exits the outer edge of the cluster from 2417a to 2417b and suffers four deflections, exits the outer RXIR lenslet near the derivative discontinuity with outer RR lenslet of the lens and is directed towards the border of the pupil range 2412b. The design of the outer lenslet is similar to the lenslet designs described in Section 6.6 of PCT1.

Figure 25:
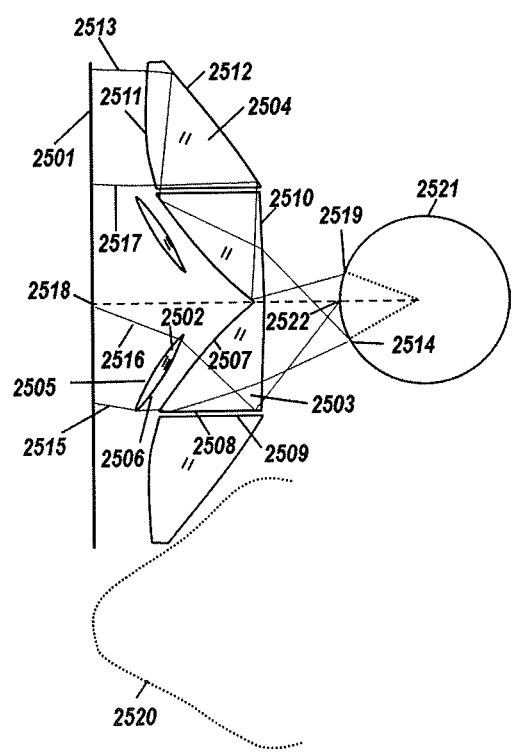
FIG. 25 is a cross-sectional view of an embodiment which uses a low index gap to gain compactness.

A top view of a horizontal cross section of another configuration is shown in FIG. 25, with the vertical digital display 2501, and the user's nose 2520 and eye 2521 drawn for orientation purposes. This configuration consists of four lenslets whose working principles are different. It does not require any mirror coatings and allows a shorter display to eye distance than the device in FIG. 12. The device of FIG. 25 has a total four opixels clusters per eye in the digital display 2501. One lenslet is formed by pieces 2503 and 2504 and covers the pupil range where the eye usually gazes, i.e. a conical angular range of about 0°-20° measured from the eye sphere center, which is the region where we need higher image The rays that belong to this lenslet of the optical system suffer 6 deflections in 2 separate lens pieces. Alternatively, the air gap between the two pieces 2504 and 2503 (between surfaces 2508 and 2509) can be filled with a low index material such as a fluoropolymer like FEP. The same piece 2503 and a separate thin lens 2502 form another lenslet whose virtual image covers a narrower angular range of about 10° starting where the first conical range ends (approximately from 20°-30°) measured from the eye sphere center, which is rarely gazed by the eye. In this lenslet the rays suffer 5 deflections in 2 separate lens pieces. The central piece 2503 is used in both types of lenslet, but the ray path is different for different lenslets. We illustrate working principle of this embodiment in FIG. 25.

FIG. 25 shows 4 lenslets in two pairs separated with a dashed line (central axis or plane of symmetry) and 3 separate optical lens pieces 2502, 2503 and 2504 per pair of lenslets. Lens 2503 may be either a single lens piece shared between the upper and lower lenslets, as illustrated in FIG. 25, or it can be made in several separate pieces. This second option is feasible as the thickness of piece 2503 along the optical axis is small and the influence of optical cross-talk described with reference to FIG. 15 is negligible.

Rays 2513 and 2517 exit the edges of one of the peripheral clusters of digital display 2501 as shown in FIG. 25, suffer refraction on entrance surface 2511, total internal reflection on back surface 2512, refractions on surfaces 2509 and 2508 at the gap between lens pieces 2504 and 2503, total internal reflection on front surface 2507, refraction on exit surface 2510 and conclude their path through the system (after 6 deflections) at the edges of the pupil range as 2514 and 2519, respectively. The optical cross-talk is thus avoided.

Rays 2515 and 2516 exit the edges of one of the central clusters, refract on surfaces 2505 and 2506 of lens 2502, refract on front surface 2507 of lens 2503, totally internally reflect on surface 2508 at the gap with lens piece 2504, refract on surface 2510, and then ray 2515 is directed towards the pupil range edge 2514 meanwhile ray 2516 is directed towards the eye pupil position when eye rests looking forward.

Thus, in the configuration of FIG. 25, the opixel clusters corresponding to the outer parts of the final image are at the middle of the digital display 2501, and the opixel clusters corresponding to the central parts of the final image are at the outer edges of the digital display 2501. That is taken into account in generating the partial real images for each cluster.

Figure 26:
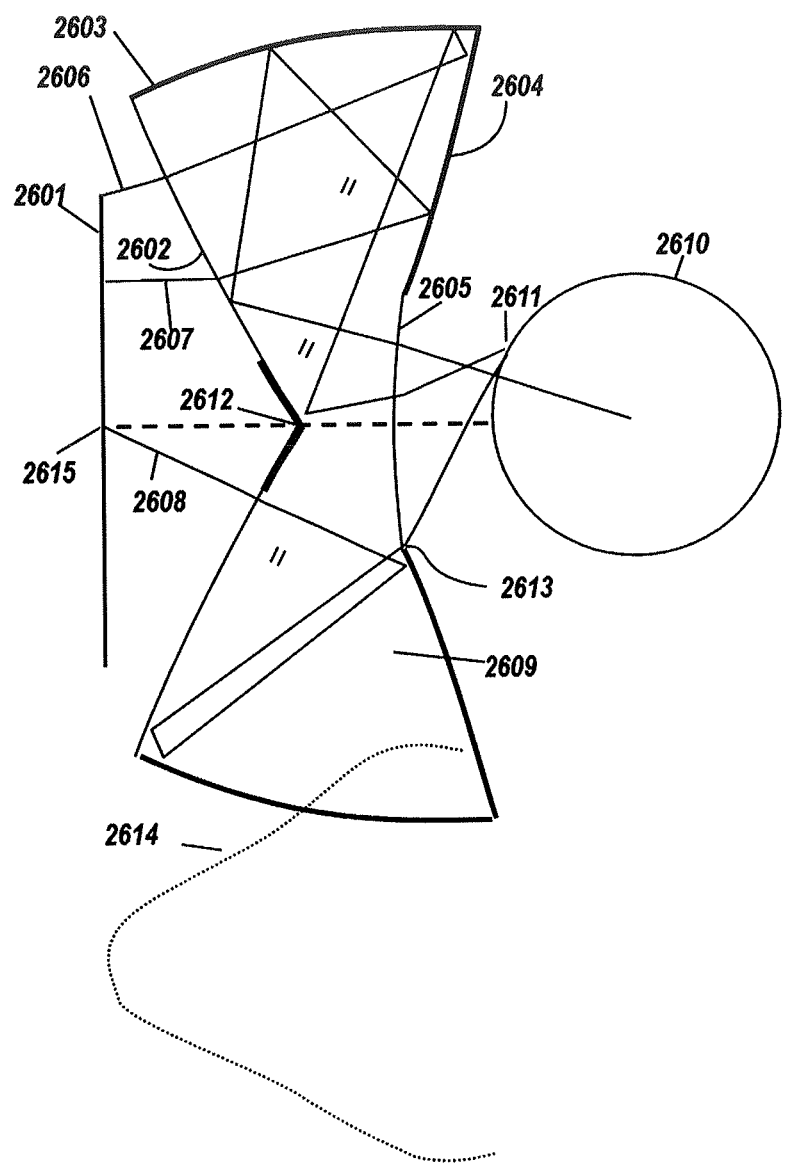
FIG. 26 is a cross-sectional view of an embodiment that substitutes the mirror of the RXIR by two mirrors.

FIG. 26 shows a top view of a horizontal cross section of another 2-lenslet configuration. User's eye 2610 and nose 2614 are shown for orientation purposes. Each lenslet of the lens 2609 has two metallized surfaces 2603 and 2604 that form a groove at the outer corner of the lenslet. Rays 2606 and 2607 exiting display 2601 are refracted at entrance surface 2602, then reflected on each groove's side—first reflection on back surface 2604 and second reflection on side surface 2603, then totally internally reflected on entrance surface 2602 and finally refracted on exit surface 2605 and directed towards the eye 2610. The same deflections happen for ray 2608. Ray 2606 coming from the opixel near the digital display edge is directed preferably towards the edge of pupil range 2611 reflecting off cusp 2612 at the central axis of lens 2609 between the entrance surfaces 2602 of the two lenslets. Ray 2608 emitted from the opixel cluster edge near the center of digital display 2615 is preferably deflected towards the border of pupil range 2611 passing through the exit's edge point 2613. The optical cross-talk needs to be avoided by a proper definition of a pupil range exactly in the same way as disclosed in patent PCT1. Maximum image quality is designed for rays such as 2607, which starts its path on the interior of one of the two clusters and reaches the eye pointing towards the eye sphere center, so it is close to the gaze vector direction.

6. Embodiments with Non-Superposable RXIR Lenslets

It is obvious that the lens and displays in FIG. 12 can be rotated outboard through an angle with respect a vertical axis passing through the eye sphere center, for instance, about 5 to 15°. This makes the whole HMD present better ergonomics, and increases the horizontal field of view by twice the angle of rotation of each lens and display. As a consequence, the binocular portion of the field of view is also reduced by twice the angle of rotation. However, better designs can be achieved for such rotated displays by breaking the symmetry of the superposable lenslets in FIG. 12, as follows.

Figure 27:
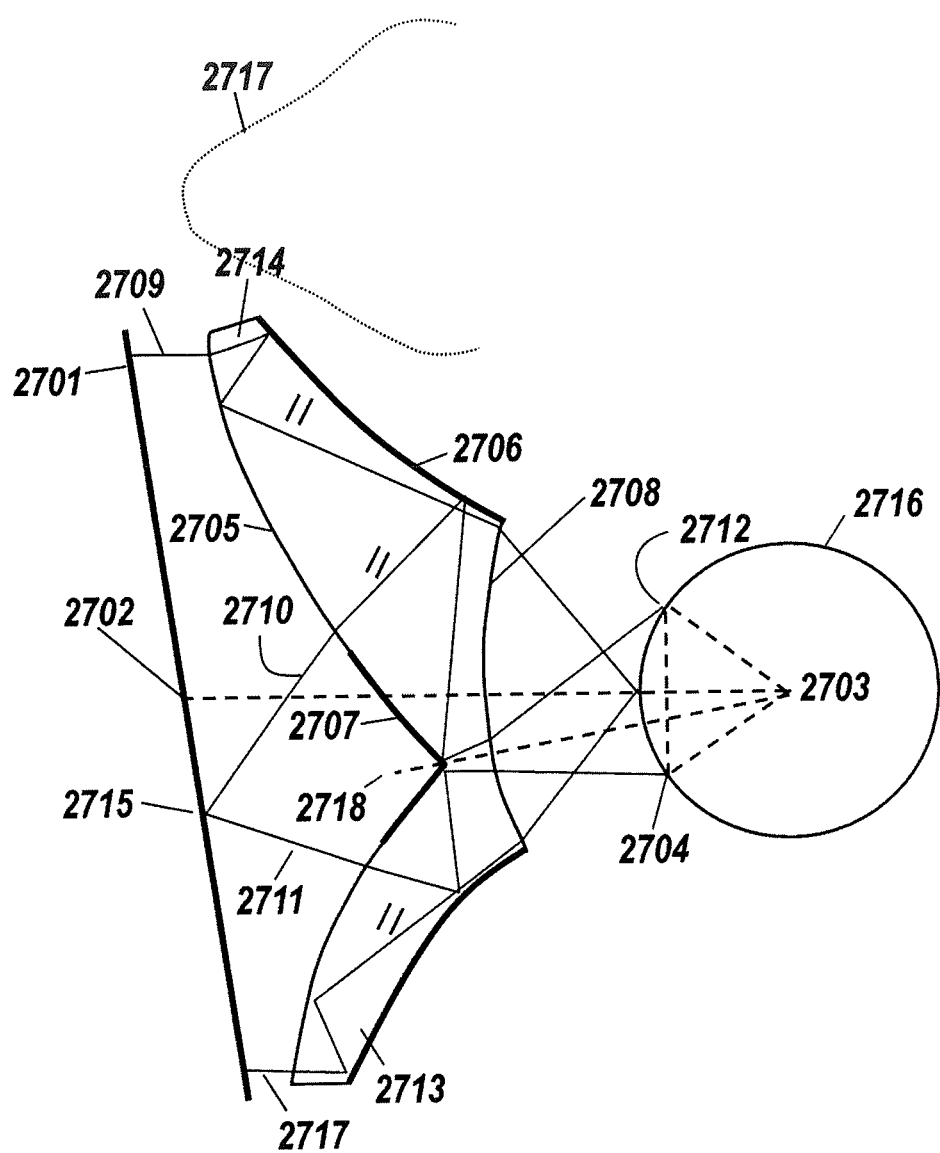
FIG. 27 is a cross-sectional view of a non-superposable embodiment with two RXIR channels for a tilted flat display per eye.

FIG. 27 shows a top view of a horizontal cross section of another 2-lenslet configuration. User's nose 2717 and eye 2716 are drawn for orientation purposes. This configuration loses the symmetry between the two lenslets (and their corresponding opixel clusters) allowing the two lenslets to have different optical performance and size. This configuration works with a tilted digital display 2701 to provide better ergonomics, and then it uses two independent digital displays, one per eye, e.g. digital display diagonal <2.5" (60 mm).

Figure 1:
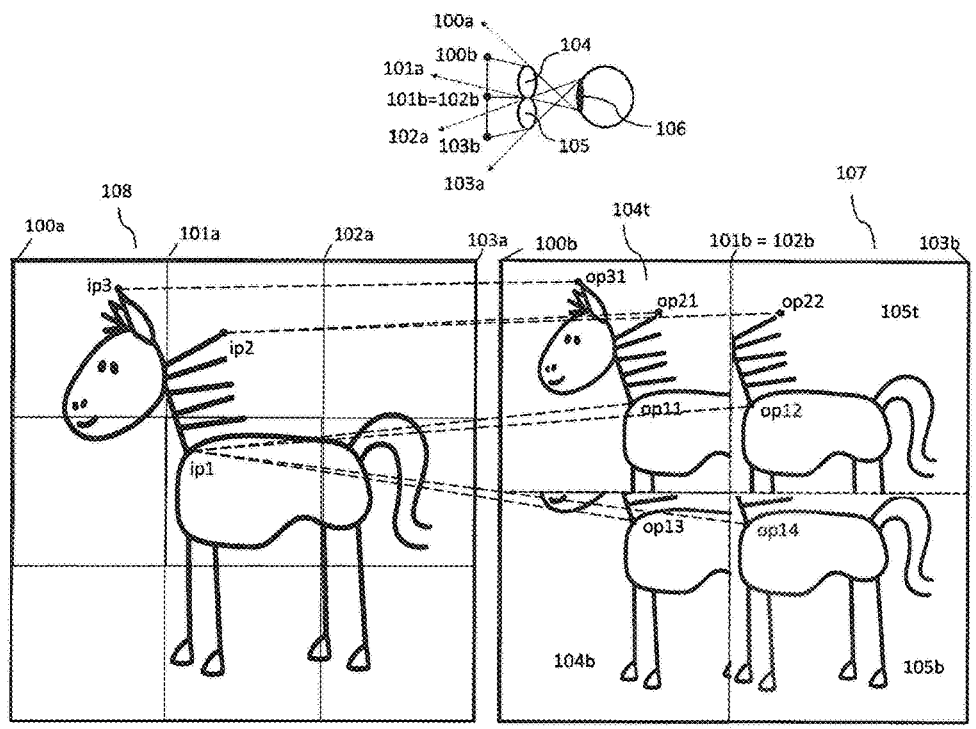
FIG. 1 is a schematic view of ipixels to opixels mapping (prior art).
Figure 2:
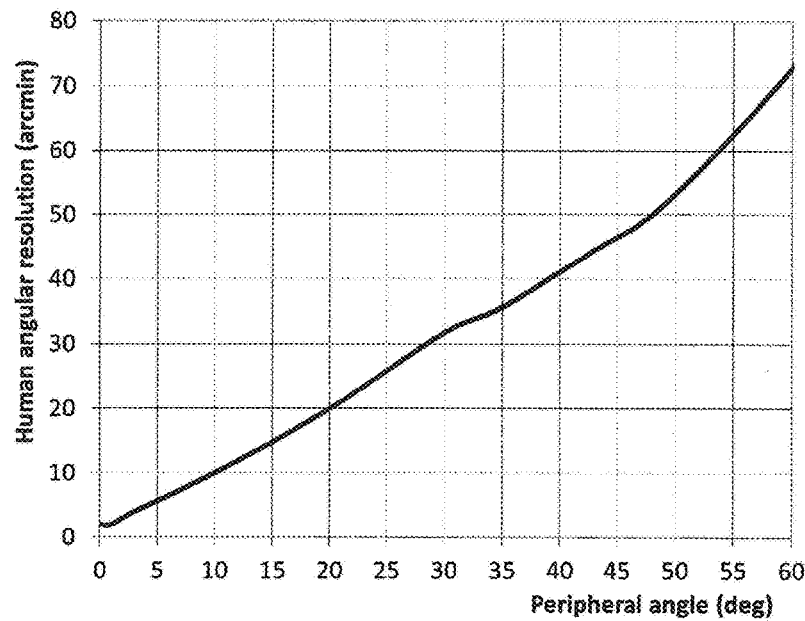
FIG. 2 shows the angular resolution of a typical human eye as a function of the peripheral angle.
Figure 3:
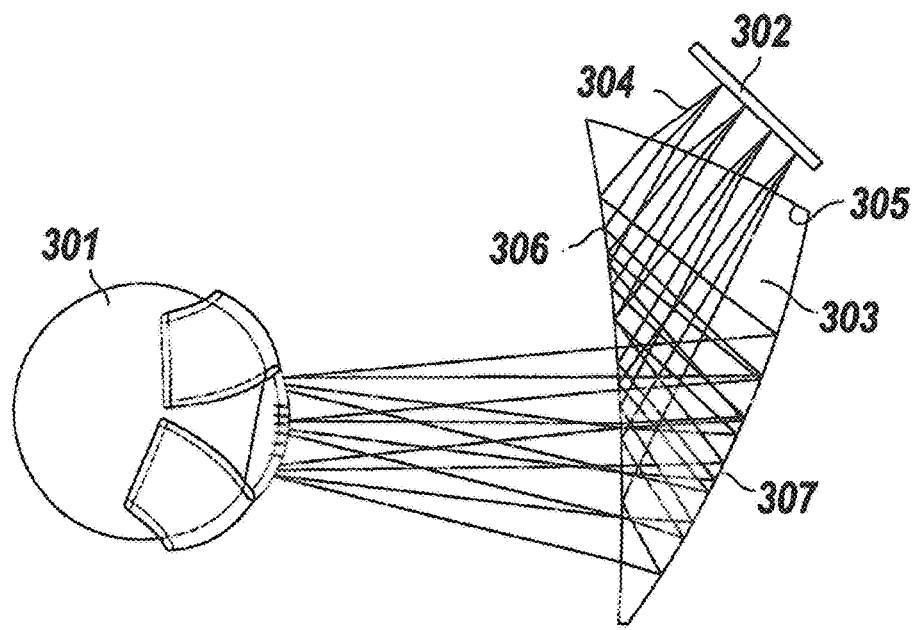
FIG. 3 is a cross-sectional view of a wedge-prism optics (prior art).
Figure 4:
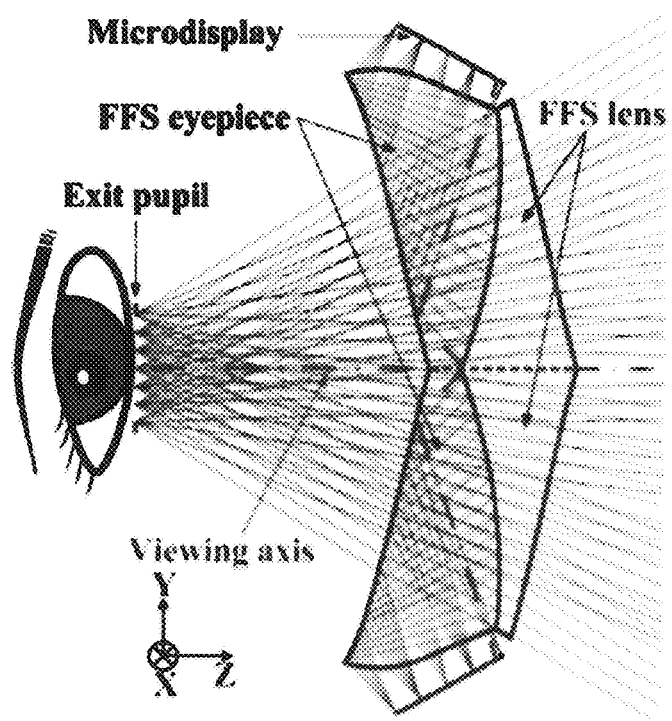
FIG. 4 is a cross-sectional view of a tiled system with non-coplanar displays (prior art).
Figure 5:
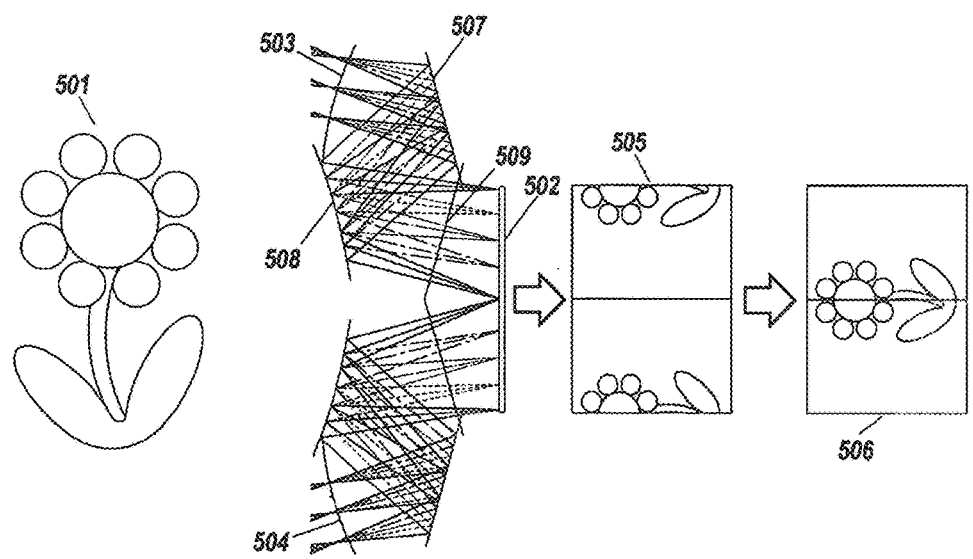
FIG. 5 is cross-sectional view of a compact camera optics design for mobile phones (prior art).

The inner, larger lenslet 2714 of the lens embodiment shown in FIG. 27 is designed for covering a wider fraction of the horizontal field of view (FOV) than the outer lenslet since the cusp at the outer edge of surface 2705 is no longer located at the front-view direction (given by the dashed line passing through 2702) but on the dashed line 2718, which forms an angle that could be about 5° to 15° with the centerline to 2702 at the center 2703 of the eye 2716. Focal distances are preferably distributed in order to have a maximum in 0° direction where the eye pupil rests looking forward (as along the axis to point 2702), and then gradually decrease when moving away from the center of the virtual screen (as shown in FIG. 2). The digital display area that works with the outer lenslet 2713 is smaller than the digital display area that works with the inner lenslet 2714, the point 2715 being at the border between the two clusters. This is the case as the inner lenslet 2714 is designed for a wider fraction of the horizontal FOV and also for higher focal lengths.

Rays 2709 and 2710 that exit digital display at the edges of the inner cluster are refracted at entrance surface 2705, reflected on back mirror surface 2706, totally internally reflected on the entrance surface 2705 (or reflected from the metallized part 2707 of surface 2705), refracted at exit surface 2708, and directed towards the eye 2716. Ray 2711 from the outer cluster has the same deflections. Ray 2710 starts its path on the edge 2715 in the inner cluster through the inner lenslet 2714 and ends on the border of the pupil range 2712. Ray 2711 is emitted at the edge 2715 in the outer cluster and thus propagates through the outer lenslet 2713. Ray 2709 determines the inner border of the horizontal monocular field of view, it refracts on inner border of the exit surface 2708 and it is emitted approximately at the inner border of digital display 2701. Analogously, ray 2717 determines the outer border of the horizontal monocular field of view, it refracts on outer border of the exit surface 2708 and it is emitted approximately at the outer border of digital display 2701.

Figure 28:
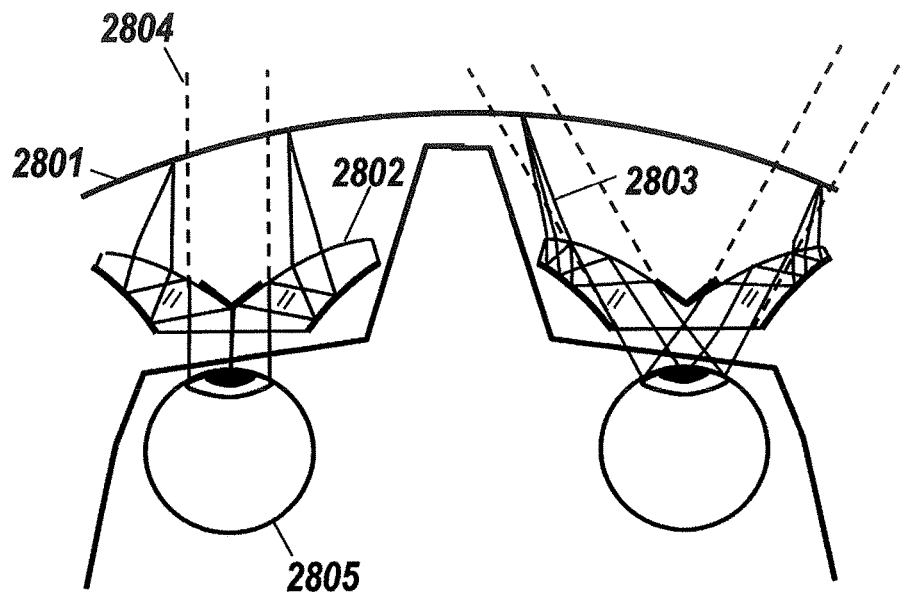
FIG. 28 is the top view of a non-superposable embodiment with two RXIR channels for a curved display.

FIG. 28 illustrates a horizontal cross-section of two similar 2-lenslet lenses similar to that of FIG. 27, one for each eye, sharing a common curved digital display 2801. Alternatively, two separate curved displays could be used. Rays exiting the cylindrical digital display 2801 suffer four deflections on their way from the digital display to the eye in the following sequence: refraction, reflection, total internal reflection and refraction. Dashed lines 2804 indicate virtual rays from the virtual screen to the eye sphere 2805. On the left are shown virtual rays for an eye looking straight ahead, and on the right are shown virtual rays for the extreme sides of the field of view. Continuous lines 2803 represent rays traveling from the digital display 2801 to the eye sphere 2805. In general, the two lenslets 2802 of each lens are not symmetric one respect the other, although each lenslet may have a horizontal plane of symmetry. Another configuration is got when these devices are rotated 90 degrees around an axis passing through the center of the eye and pointing frontwards. In this latter case, the two lenslets may be symmetric one respect to the other, but each lenslet may then have no plane of symmetry.

7. Adapting the Design to the Human Eye Resolution

FIG. 2 shows the angular resolution of a typical human eye as a function of the peripheral angle (according to J. J. Kerr, "Visual resolution in the periphery", Perception & Psychophysics, Vol. 9 (3), 1971). Since the human eye resolution is much smaller in peripheral vision than close to the gazing direction, we can adjust the design conditions of any of the embodiments in this specification to make the ipixels smaller in size on the gazed region of the virtual screen and larger in the outer region of the virtual screen. For this purpose we are going to assume that the optical systems are reasonably anastigmatic so we can define a mapping between the object and the image. Let (p, φ) be the polar coordinates of a point r on the digital display and let θ, φ be the polar and azimuthal angles, respectively, of the spherical coordinates on the virtual screen. The coordinates are defined so that θ=0 is the frontward axis, θ is the angle away from that axis, φ is the azimuth around the θ=0 axis, and the directions φ=0 and φ=π are horizontal. The function r(θ,φ) =(ρ(θ,φ)cos(φ(θ,φ)), ρ(θ,φ)sin (φ(θ,φ)) is called the mapping function. The inverse mapping function is given by (θ,φ)=(θ(r),φ(r)).

We call radial focal length $f_{rad}$ at the virtual screen direction (θ,φ) to $|\partial r/\partial \theta|$, that we will write as $|r_\theta|$. We call sagittal focal length to $f_{sag}=|r_\varphi|/\sin \theta$. For other directions different than radial or sagittal, the focal length is given by $f_\alpha=|r_\theta \cos \alpha + r_\varphi \sin \alpha/\sin \theta|$ where α is the angle formed by the radial direction and the direction along which the focal distance is calculated. The focal length informs about the expansion or shrinking of the mapping in a particular direction. When the mapping between the object and the image is conformal, then $f_\alpha$ is independent of α, which is equivalent to saying that the mapping expansion or shrinking is isotropic. The angular extent of an ipixel along the direction α can be calculated as the corresponding opixel diameter divided by the focal length, i.e., $D_\alpha/f_\alpha$ (for simplicity, circular opixels are considered herein, but the reasoning is easily extended to the usual square opixels). When there is more than one opixel for a given ipixel we may have different ratios if the optical system is not properly designed. The human eye resolution depends on the peripheral angle but is to a good approximation not dependent on the direction α along which the resolution is evaluated. Then it is desirable that the angular extension of the ipixels be independent of α (otherwise the resolution will be given by the greatest angular diameter). Since the diameter of the opixels is in general quite constant with α then an $f_\alpha$ independent of α is in general desirable.

The idea of an optical design whose resolution changes across the field of view and is adapted to that of human vision was introduced in PCT1, section 6.8. Human vision resolution peaks on the part of the scene imaged at the fovea and decreases as we move from that part. Assume the eye is gazing at front direction (θ=0). Hence, longer radial focal lengths (leading to smaller ipixel angular size and hence higher optical resolution) should be used for low values of θ where higher resolution is needed while, in the case of high values of θ (peripheral view), shorter focal lengths are acceptable since the eye resolution is lower for those angles.

Figure 29:
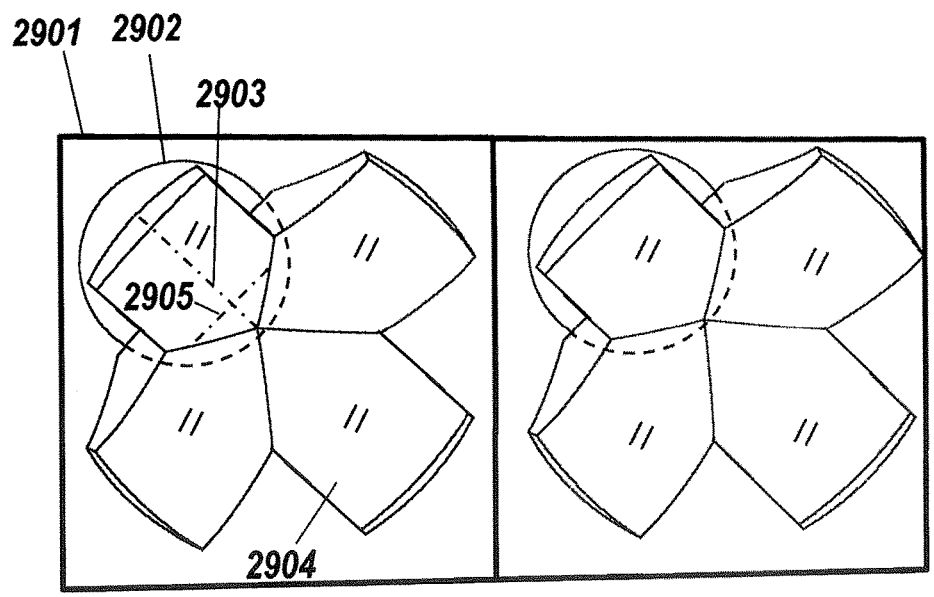
FIG. 29 is a perspective view of two 4-fold designs for a single display for both eyes.
Figure 30:
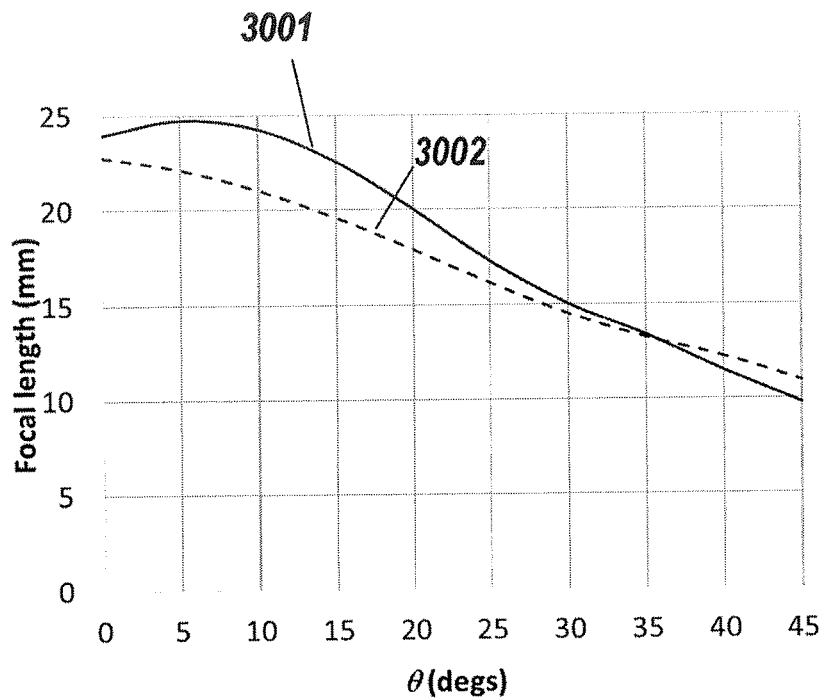
FIG. 30 shows the radial and sagittal focal lengths along the diagonal line of one lenslet in FIG. 29.
Figure 31A:
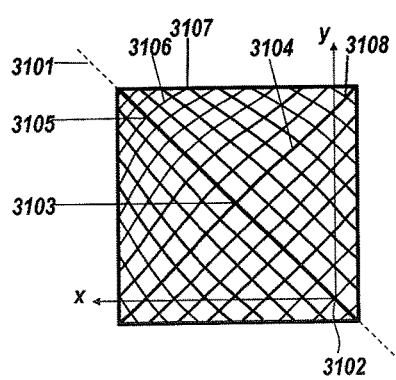
FIG. 31A shows several characteristic lines of ipixels to opixels mapping on the digital display.
Figure 31B:
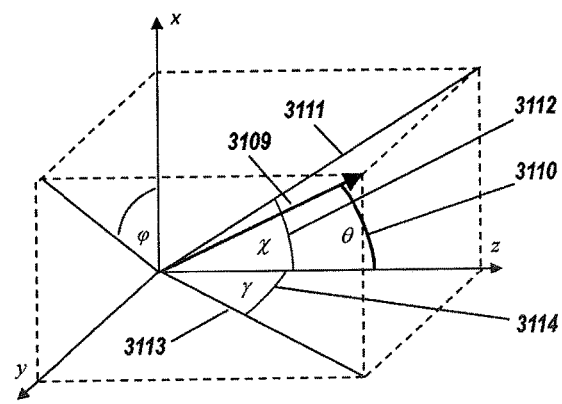
FIG. 31B is a diagram for defining several angles.

FIG. 29 shows a 4-lenslet embodiment 2904. The surfaces of each lenslet have a plane of symmetry coinciding with the diagonal direction of the half of the display. Thus, the mapping function φ (θ,φ) for one lenslet fulfills that φ (θ,φ=45°)=45°. This device has variable focal length. In particular, the radial focal length $f_{rad}=|r_\theta|$ decreases along the φ=constant lines as θ increases. The focal length in the transverse direction $f_{sag}=|r_g|/\sin \theta$ is designed to be essentially equal to $f_{rad}$ in order to give an optimal use of the display active area. FIG. 30, FIG. 31A, and FIG. 31B show the results obtained for the design of FIG. 29 regarding the focal length distribution.

FIG. 29 shows a display 2901 with aspect ratio close to 2:1 (for example, the 16:9 aspect ratio that is a current standard) placed in a plane perpendicular to the floor with its longest dimension parallel to the floor. FIG. 29 also shows two 4-lenslet devices 2904 (one per eye) in front of the digital display, each one in front of the respective half display that it is imaging, similar to the lens 1807 disclosed in FIG. 18 but with a 45 degree rotation about an axis normal to the display. Therefore, the 4-fold device is placed so the diagonal 2903 along the center of one of the lenslets 2902 is generally parallel to the diagonal of the half digital display as shown in FIG. 29.

FIG. 30 shows the radial and sagittal focal lengths as function of the angle θ along the line φ=45 deg. This illustration is done for one lenslet 2902 of the 4-lenslet device 2904 of FIG. 29. Radial focal length is marked with full line 3001, and the sagittal one 3002 with dashed line. Both focal length distributions have the maximum value close to B=0°, and they gradually decrease for greater angles θ, particularly beyond 20 degrees. We may observe that both focal lengths (radial and sagittal) are balanced at each value of angle θ along the diagonal line φ=45 degrees in both radial and sagittal directions.

FIG. 31A shows the portion of the display 2901 (in FIG. 29) which illuminates through lenslet 2902 the eye pupil when this pupil has 4 mm diameter and the eye is gazing frontwards. This half display is divided into 4 square clusters, each working with one lenslet 2902 of the 4-lenslet device 2904. The direction θ=0 is imaged on the digital display at the point ρ=0, (3102) i.e. (x,y)=(0,0) in FIG. 31A. As is shown in FIG. 31B, we definer as the angle 3112 between the projection 3111 on the xz-plane of the direction 3109 of a pixel under consideration and the z-axis, and we define γ as the angle 3114 between the projection 3113 on the yz-plane of the direction 3109 and the z-axis. The angle θ (3110) can be expressed as $$\theta = \arccos\sqrt{\frac{1}{\tan^2 \chi + \frac{1}{\cos^2 \gamma}}}$$

in terms of χ and γ, which can be expressed as functions of θ and ω as χ=arctan(cos φ tan θ) and γ=arctan(sin φ tan θ). Full lines shown in FIG. 31A inside of the square section of the display represent the curves χ−γ=const. and χ+γ=const. mapped by the lenslet 2902 (FIG. 29) onto the digital display, for 2.5 degree increments of those constants. Line 3101 represents the curve for χ−γ=0 i.e., for φ=45 degrees whose radial and sagittal focal lengths as function of the angle Dare shown in FIG. 30. With this focal length distribution paired in two perpendicular directions an observer sees approximately a square ipixel area if the original opixels are also squares. The radial and sagittal focal lengths in the neighborhood of the point 3102 are 23.5 and 22.8 mm, respectively. Additionally, near the point 3103 at the center of FIG. 31A the focal lengths are 17.3 and 16.2 mm and along the isocurve 3104 (χ+γ=20 deg.) the radial and sagittal focal lengths are maintained substantially constant, so in the neighborhood of the point 3108 we have 17.6 and 18.0 mm, respectively. For higher values of the angle θ, e.g. in the neighborhood of the point 3105, focal lengths are 11.5 and 12.2 mm. At the point 3107, which is in the same isocurve (χ+γ=const.) 3106 as the point 3105, the focal lengths are 12.5 and 12.9 mm. From those exemplary values, we may see how focal distance values are balanced in two perpendicular directions, highest in the central region of display and how they gradually decrease going towards the display edge.

8. Detailed Example of a 2-Fold Superposable Optics

This section describes in detail the optical design for the configuration previously described. This configuration consists of one thin freeform lens where rays suffer two refractions and another lens where rays suffer 4 deflections on 3 freeform surfaces (1 optical surface is used twice). The optical design is done by multiparameter optimization of the coefficients of a polynomial expansion, preferably using an orthogonal basis. In the embodiments described herein, surfaces are described with the following equation:

$$Pm(x, y) = \sum_{i=0}^{\frac{m}{2}} \sum_{j=0}^{m} c_{2i,j} P_{2i}\left(\frac{x - \frac{x_{max} + x_{min}}{2}}{x_{max}}\right) P_j\left(\frac{y - \frac{y_{max} + y_{min}}{2}}{y_{max}}\right)$$

where $Pm(x,y)$ is the $10^{th}$ order polynomial, i.e. m=10, $c_{2i,j}$ are the optimized surface coefficients listed in Table 1 below, and $P_{2i}((x-(x_{max}+x_{min})/2)/x_{max})$ and $P_j((y-(y_{max}+y_{min})/2)/y_{max})$ are Legendre polynomials that are orthogonal inside of the area restricted with $x_{min}$ and $x_{max}$, $y_{min}$ and $y_{max}$ in x and y directions, respectively. All surfaces have plane symmetry in the yz-plane, i.e., the plane x=0 (plane of the drawing shown in FIG. 32) so Legendre polynomial $P_{2i}((x-(x_{max}+x_{min})/2)/x_{max})$ has only pair order monomials.

Explicit representation of Legendre polynomials includes:

$$P_n(x) = \frac{1}{2^n} \sum_{k=0}^{n} \binom{n}{k}^2 (x-1)^{n-k}(x+1)^k = 2^n \sum_{k=0}^{n} x^k \binom{n}{k}\binom{\frac{n+k-1}{2}}{n}$$

where the latter expresses the Legendre polynomials by simple monomials and involves the multiplicative formula of the binomial coefficient, and where $$\binom{n}{k} = \frac{n!}{k!(n-k)!}.$$

Figure 32:
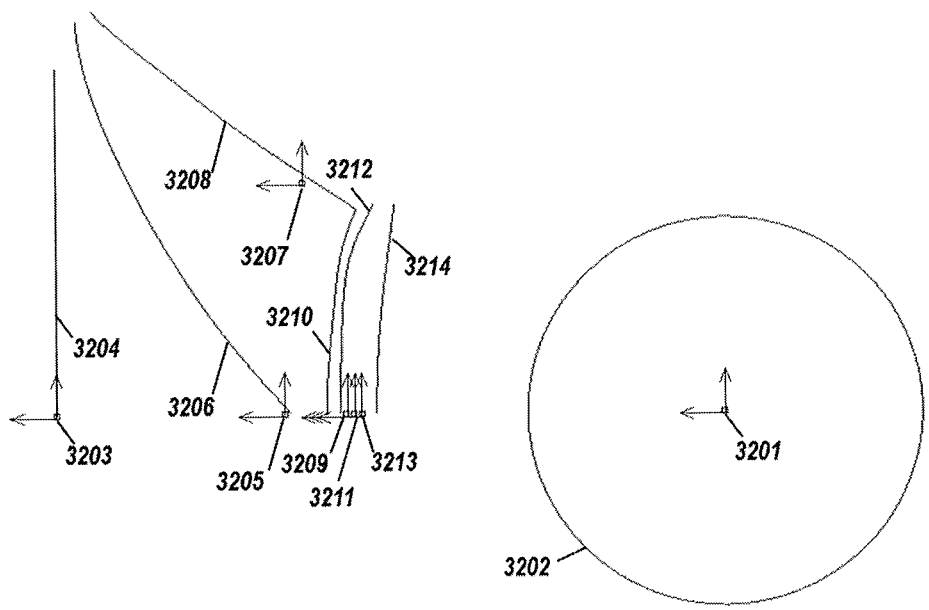
FIG. 32 describes the local coordinate system used to represent the surfaces of the detailed design.

FIG. 32 shows local coordinate system of each surface polynomial description in yz-plane, x=0 (where the z-axis points left and the y-axis points up). The eye sphere center is labeled with 3201 and we use it as the center of the global coordinate system (x,y,z)=(0,0,0). Eye sphere is labeled as 3202. The local coordinate system origin 3203 used for the display 3204 has coordinates (x,y,z)=(0, 0, 44.00). Surface 1 is labeled as 3206 and its local coordinate origin 3205 is placed at (x,y,z)=(0, 0, 29.04540). Surface 2 is labeled as 3208 and its local coordinate origin 3207 is placed at (x,y,z)=(0, 15.5041, 27.85875). Surface 3 is labeled as 3210 and its local coordinate origin 3209 is placed at (x,y,z)=(0, 0, 25.00). Surface 4 is labeled as 3212 and its local coordinate origin 3211 is placed at (x,y,z)=(0, 0, 24.50). Surface 5 is labeled as 3214 and its local coordinate origin 3213 is placed at (x,y,z)=(0, 0, 24.00). Coordinates are given in mm. Coefficients of all surfaces' polynomials are listed in Table 1. The first four rows are C1:$x_{min}$, C2:$x_{max}$, C3:$y_{min}$ and C4:$y_{min}$ that describe a rectangular area between $x_{min}$ and $x_{max}$ in the x-direction, and $y_{min}$, and $y_{max}$ in the perpendicular y-direction where each polynomial is orthogonal. The next rows C5 to C97 of Table 1 are coefficients of $10^{th}$ order Legendre polynomial Pm(x,y) for each surface we have designed. Surfaces 3, 4, and 5 have plane symmetries in both x=0 and y=0 planes. The coefficients that do not appear in Table 1 are equal to zero.

TABLE 1

| Parameter | surface 1 | surface 2 | surface 3 | surface 4 | surface 5 |
| --- | --- | --- | --- | --- | --- |
| C1: $x_{min}$ | −14.5 | −18 | −12.5 | −10.5 | −10.5 |
| C2: $x_{max}$ | 14.5 | 18 | 12.5 | 10.5 | 10.5 |
| C3: $y_{min}$ | −5 | −4 | −15 | −15 | −15 |
| C4: $y_{max}$ | 26 | 13 | 15 | 15 | 15 |
| C5: c00 | 7.74826817 | 9.48685118 | 1.98441208 | −0.03714411 | −1.01185865 |
| C6: c01 | 9.9901003 | 15.9891329 | 0 | 0 | 0 |
| C7: c02 | −2.17415555 | 1.84212394 | −1.02213907 | −0.18904498 | −0.39442517 |
| C8: c03 | 0.26992555 | 1.37861982 | 0 | 0 | 0 |
| C9: c04 | 0.07323412 | 1.32413174 | 0.21297795 | −0.97463799 | −0.56541986 |
| C10: c05 | 0.07232204 | 0.62427156 | 0 | 0 | 0 |
| C11: c06 | 0.07046191 | 0.37600442 | −0.25925897 | −0.11307267 | −0.03753875 |
| C12: c07 | 0.01669641 | 0.19622519 | 0 | 0 | 0 |
| C13: c08 | 0.00564396 | 0.08847943 | 0.01571654 | 0.02814461 | −0.05840282 |
| C14: c09 | 0 | 0.02943414 | 0 | 0 | 0 |
| C15: c010 | 0 | −0.00486727 | 0.02433397 | 0.01892424 | −0.01243578 |
| C27: c20 | 2.90274519 | 10.1007194 | 3.00674917 | −0.27538838 | 1.22293126 |
| C28: c21 | 0.92173438 | 11.1935568 | 0 | 0 | 0 |
| C29: c22 | −0.03224471 | 4.7809068 | 1.01919509 | 3.63663724 | 1.51062622 |
| C30: c23 | 0.51128187 | 3.66039714 | 0 | 0 | 0 |
| C31: c24 | 0.39628668 | 2.42170405 | 1.38578164 | −0.18246823 | −1.12598721 |
| C32: c25 | 0.30566662 | 1.98779412 | 0 | 0 | 0 |
| C33: c26 | 0.13709387 | 0.4712952 | 0.15831457 | −0.00439278 | −0.12677413 |
| C34: c27 | 0.02746642 | 0.2983583 | 0 | 0 | 0 |
| C35: c28 | −0.01145297 | −0.02158365 | −0.12161842 | −0.17362037 | −0.03418757 |
| C36: c29 | 0.00482329 | −0.00669569 | 0 | 0 | 0 |
| C49: c40 | 0.10779636 | 1.84116064 | 0.1079878 | 0.5172034 | 0.33745174 |
| C50: c41 | 0.04121436 | 2.16314619 | 0 | 0 | 0 |
| C51: c42 | 0.0693218 | −0.21160035 | −0.10957435 | 1.05534915 | 0.55827464 |
| C52: c43 | 0.04130056 | 0.33742766 | 0 | 0 | 0 |
| C53: c44 | −0.02768964 | 0.27471767 | 0.48922576 | 0.82583368 | 0.24898517 |
| C54: c45 | 0.03481823 | 0.38273918 | 0 | 0 | 0 |
| C55: c46 | 0.01519245 | −0.12692111 | 0.32196795 | 0.44845829 | −0.04187352 |
| C56: c47 | 0.00134877 | −0.00406391 | 0 | 0 | 0 |
| C57: c48 | 0 | 0 | 0.086918 | 0.16666561 | 0.03091233 |
| C71: c60 | −0.07007249 | 0.28370224 | −0.05702479 | 0.02249273 | 0.02618387 |
| C72: c61 | 0.13503468 | 0.59377583 | 0 | 0 | 0 |
| C73: c62 | 0.12422693 | −0.11686878 | −0.09428408 | 0.05765244 | 0.096821 |
| C74: c63 | −0.09692662 | 0.06321373 | 0 | 0 | 0 |
| C75: c64 | −0.03198063 | 0.05192254 | −0.2357585 | 0.05293862 | 0.0681094 |
| C76: c65 | 0.03040448 | 0.19384503 | 0 | 0 | 0 |
| C77: c66 | 0.00864096 | −0.04787574 | −0.24718492 | −0.04115771 | 0.04880808 |
| C78: c67 | 0 | 0.00360285 | 0 | 0 | 0 |
| C79: c68 | 0 | 0 | −0.12242551 | −0.04221036 | 0 |
| C93: c80 | −0.00354415 | 0.07247046 | 0.01092137 | −0.0058482 | −0.006173 |
| C94: c81 | −0.00500629 | 0.07485071 | 0 | 0 | 0 |
| C95: c82 | 0.01760391 | −0.01142592 | 0.06069702 | 0.03417736 | 0.01180534 |
| C96: c83 | −0.00071029 | 0.00071433 | 0 | 0 | 0 |
| C97: c84 | 0 | 0 | −0.00740858 | −0.00163364 | 0.00492729 |

Figure 33:
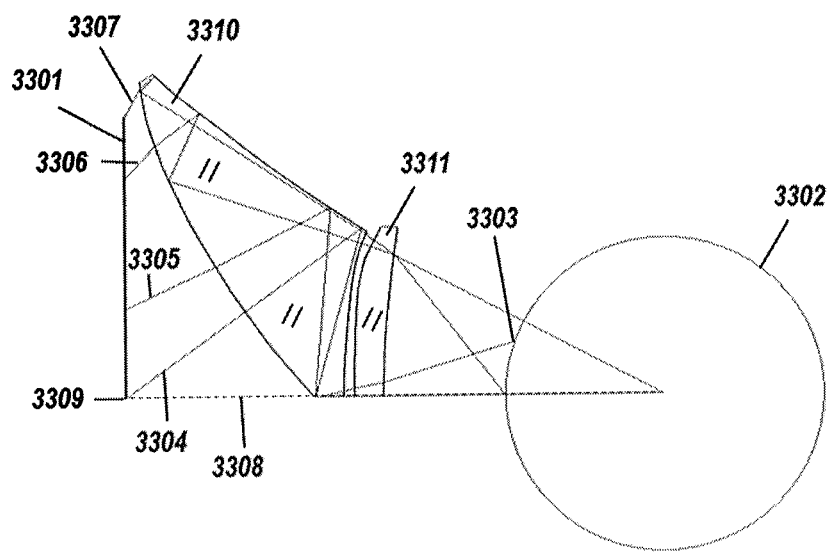
FIG. 33 is the cross-sectional view of the detailed design showing some characteristics rays.

FIG. 33 illustrates the x=0 plane of a lenslet belonging to a 2-lenslet design such as the one shown in FIG. 23 (using a continuous freeform lens 3311 instead of a Fresnel lens). Half of the display is labeled as 3301 and user's eye is 3302. The complete design would be obtained with a mirror image of the shown lenses 3310 and 3311 with respect the y=0 plane that contains axis 3308. In FIG. 33 we may examine design rays trajectories. Reverse ray 3304 comes from the border of the pupil range 3303, impinges at the cusp of surface 1 (surface 3206 of FIG. 32) and it is sent to the cluster edge 3309. The reverse ray 3305 exits the eye parallel to the z axis. The reverse ray 3306 comes from the eye sphere center, it impinges on the border of surface 5 (surface 3214 of FIG. 32) and it impinges on the display. The reverse ray 3307 fixes one end of the field of view as it is the border peripheral ray that impinges on the border of surface 5 from the eye pupil position when the eye rests looking forward.

Figure 34:
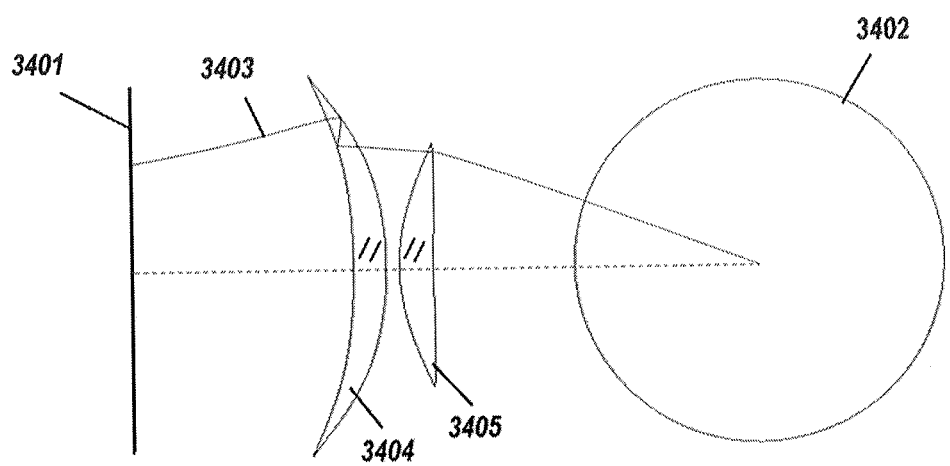
FIG. 34 is another cross-sectional view of the same design in FIG. 33.

FIG. 34 is the cross section at the plane y=0 of one lenslet belonging to the 2-lenslet configuration also shown in FIG. 33. This section is perpendicular to the section shown in FIG. 33. The display is 3401 and the user's eye is 3402. Lenses 3404 and 3405 correspond to 3310 and 3311 in FIG. 33, respectively. The reverse ray 3403 exits the eye pupil when this eye pupil gazes near the border of pupil range.

Table 2 and Table 3 show the root-mean-square (RMS) diameters of the polychromatic spots for some selected fields of the design in FIG. 33 using a pupil diameter of 4 mm. This design has a focal length about 26 mm for the front direction and the focal length gradually decreases towards the edge of the field of view to be adapted to the eye resolution. The horizontal field of view is 108 degrees and vertical field of view is 93 degrees for a 2.1" (55 mm) diagonal 16:9 display. Angles x and y in the table have the same definitions as in FIG. 31B.

Table 2 corresponds to the situation when the eye is gazing the said field, so the peripheral angle for the human eye perception is 0 for all the fields, and thus the optical resolution should be the maximum for this field. Table 2 shows that opixels as small as 20-30 microns can be resolved well, although the RMS diameter increases significantly for the highest values of the angle $\chi$(deg). This is caused by chromatic aberration, which can be easily corrected by adding a diffractive kinoform, preferably in one of the surfaces 3210, 3212 or 3214 in FIG. 32. For easier manufacturability, these kinoforms should be added on a non freeform surface. The case when the vertices of the kinoform facets are contained in planes parallel to the plane of FIG. 32 is of special interest.

Table 3 corresponds to the situation when the eye is gazing frontwards, so the peripheral angle for the human eye perception is not zero, but equal to 9. Therefore, the optical resolution can be lower without affecting the human perception of optical quality. This design is adapted to the human eye resolution of FIG. 2. For this reason, the RMS values are much higher in Table 3 than in Table 2 for the same fields.

TABLE 2

| $\chi$ (deg) | $\gamma$ (deg) | RMS (μm) |
|---|---|---|
| 0 | 0 | 19.1 |
| 0 | 2 | 19.2 |
| 0 | 4 | 14.4 |
| 0 | 6 | 16.3 |
| 0 | 8 | 18.7 |
| 0 | 10 | 19.2 |
| 0 | 12 | 16.4 |
| 0 | 14 | 13.2 |
| 0 | 16 | 17.8 |
| 0 | 18 | 22.3 |
| 0 | 20 | 22.7 |
| 0 | 22 | 24.0 |
| 0 | 24 | 28.6 |
| 0 | 26 | 32.9 |
| 0 | 28 | 40.0 |
| 0 | 30 | 76.8 |
| 2 | 0 | 20.3 |
| 2 | 2 | 20.7 |
| 2 | 4 | 16.0 |
| 2 | 6 | 17.6 |
| 2 | 8 | 19.8 |
| 2 | 10 | 20.5 |
| 2 | 12 | 17.7 |
| 2 | 14 | 14.8 |
| 2 | 16 | 19.1 |
| 2 | 18 | 23.3 |
| 2 | 20 | 23.2 |
| 2 | 22 | 24.8 |
| 2 | 24 | 28.9 |
| 2 | 26 | 33.9 |
| 2 | 28 | 43.3 |
| 2 | 30 | 81.4 |
| 4 | 0 | 23.9 |
| 4 | 2 | 24.4 |
| 4 | 4 | 20.4 |
| 4 | 6 | 20.9 |
| 4 | 8 | 22.5 |
| 4 | 10 | 22.6 |
| 4 | 12 | 19.9 |
| 4 | 14 | 18.2 |
| 4 | 16 | 22.4 |
| 4 | 18 | 25.6 |
| 4 | 20 | 24.8 |
| 4 | 22 | 25.9 |
| 4 | 24 | 30.1 |
| 4 | 26 | 35.1 |
| 4 | 28 | 53.0 |
| 4 | 30 | 96.1 |
| 6 | 0 | 28.5 |
| 6 | 2 | 29.2 |
| 6 | 4 | 25.5 |
| 6 | 6 | 25.7 |
| 6 | 8 | 26.1 |
| 6 | 10 | 26.2 |
| 6 | 12 | 25.0 |
| 6 | 14 | 23.2 |
| 6 | 16 | 26.5 |
| 6 | 18 | 28.8 |
| 6 | 20 | 27.1 |
| 6 | 22 | 28.4 |
| 6 | 24 | 32.5 |
| 6 | 26 | 37.2 |
| 6 | 28 | 65.7 |
| 6 | 30 | 117.0 |
| 8 | 0 | 33.0 |
| 8 | 2 | 34.2 |
| 8 | 4 | 29.7 |
| 8 | 6 | 29.2 |
| 8 | 8 | 29.9 |
| 8 | 10 | 30.3 |
| 8 | 12 | 29.6 |
| 8 | 14 | 29.1 |
| 8 | 16 | 31.1 |
| 8 | 18 | 32.7 |
| 8 | 20 | 31.5 |
| 8 | 22 | 32.9 |
| 8 | 24 | 36.2 |
| 8 | 26 | 39.7 |
| 8 | 28 | 83.3 |
| 8 | 30 | 139.7 |
| 10 | 0 | 38.3 |
| 10 | 2 | 39.5 |
| 10 | 4 | 36.7 |
| 10 | 6 | 35.6 |
| 10 | 8 | 35.9 |
| 10 | 10 | 34.9 |
| 10 | 12 | 35.2 |
| 10 | 14 | 35.2 |
| 10 | 16 | 36.5 |
| 10 | 18 | 38.0 |
| 10 | 20 | 37.9 |
| 10 | 22 | 37.4 |
| 10 | 24 | 40.6 |
| 10 | 26 | 44.8 |
| 10 | 28 | 105.8 |
| 10 | 30 | 165.7 |
| 11 | 0 | 40.4 |
| 11 | 2 | 42.0 |
| 11 | 4 | 39.5 |
| 11 | 6 | 38.2 |
| 11 | 8 | 38.4 |
| 11 | 10 | 37.4 |
| 11 | 12 | 38.0 |
| 11 | 14 | 38.3 |
| 11 | 16 | 39.6 |
| 11 | 18 | 41.3 |
| 11 | 20 | 41.5 |
| 11 | 22 | 41.9 |
| 11 | 24 | 42.9 |
| 11 | 26 | 48.0 |
| 13 | 0 | 43.9 |
| 13 | 2 | 46.7 |
| 13 | 4 | 44.7 |
| 13 | 6 | 43.4 |
| 13 | 8 | 43.8 |
| 13 | 10 | 42.6 |
| 13 | 12 | 43.6 |
| 13 | 14 | 44.6 |
| 13 | 16 | 46.3 |
| 13 | 18 | 48.5 |
| 13 | 20 | 48.3 |
| 13 | 22 | 46.0 |
| 13 | 24 | 49.5 |
| 13 | 26 | 81.1 |
| 15 | 0 | 48.2 |
| 15 | 2 | 52.2 |
| 15 | 4 | 50.2 |
| 15 | 6 | 48.4 |
| 15 | 8 | 48.7 |
| 15 | 10 | 47.5 |

TABLE 2

| χ (deg) | γ (deg) | RMS (μm) |
| --- | --- | --- |
| 0 | 0 | 19.1 |
| 0 | 3 | 20.6 |
| 0 | 6 | 23.1 |
| 0 | 9 | 41.6 |
| 0 | 12 | 48.9 |
| 0 | 15 | 51.0 |
| 0 | 18 | 56.6 |
| 0 | 21 | 65.2 |
| 0 | 24 | 69.8 |
| 0 | 27 | 68.0 |
| 0 | 30 | 69.1 |
| 0 | 33 | 87.1 |
| 0 | 36 | 124.8 |
| 0 | 39 | 170.2 |
| 0 | 42 | 193.8 |
| 0 | 45 | 206.2 |
| 0 | 48 | 216.0 |
| 0 | 51 | 199.9 |
| 3 | 0 | 27.8 |
| 3 | 3 | 23.8 |
| 3 | 6 | 23.5 |
| 3 | 9 | 41.2 |
| 3 | 12 | 48.5 |
| 3 | 15 | 50.6 |
| 3 | 18 | 55.8 |
| 3 | 21 | 64.0 |
| 3 | 24 | 68.3 |
| 3 | 27 | 66.5 |
| 3 | 30 | 68.9 |
| 3 | 33 | 88.8 |
| 3 | 36 | 127.4 |
| 3 | 39 | 172.5 |
| 3 | 42 | 197.0 |
| 3 | 45 | 212.3 |
| 3 | 48 | 222.0 |
| 3 | 51 | 199.7 |
| 6 | 0 | 44.9 |
| 6 | 3 | 32.6 |
| 6 | 6 | 25.7 |
| 6 | 9 | 40.5 |
| 6 | 12 | 47.5 |
| 6 | 15 | 49.3 |
| 6 | 18 | 53.8 |
| 6 | 21 | 60.6 |
| 6 | 24 | 64.0 |
| 6 | 27 | 62.9 |
| 6 | 30 | 69.1 |
| 6 | 33 | 94.3 |
| 6 | 36 | 135.6 |
| 6 | 39 | 180.0 |
| 6 | 42 | 207.4 |
| 6 | 45 | 229.4 |
| 6 | 48 | 236.7 |
| 6 | 51 | 206.2 |
| 9 | 0 | 64.0 |
| 9 | 3 | 46.3 |
| 9 | 6 | 33.4 |
| 9 | 9 | 41.1 |
| 9 | 12 | 46.5 |
| 9 | 15 | 47.5 |
| 9 | 18 | 50.5 |
| 9 | 21 | 55.2 |
| 9 | 24 | 57.4 |
| 9 | 27 | 58.6 |
| 9 | 30 | 72.8 |
| 9 | 33 | 104.9 |
| 9 | 36 | 149.5 |
| 9 | 39 | 194.7 |
| 9 | 42 | 224.1 |
| 9 | 45 | 253.6 |
| 9 | 48 | 248.9 |
| 9 | 51 | 214.5 |
| 12 | 0 | 83.9 |
| 12 | 3 | 63.8 |
| 12 | 6 | 45.8 |
| 12 | 9 | 44.0 |
| 12 | 12 | 44.7 |
| 12 | 15 | 44.2 |
| 12 | 18 | 45.8 |
| 12 | 21 | 48.1 |
| 12 | 24 | 50.0 |
| 12 | 27 | 57.8 |
| 12 | 30 | 82.8 |
| 12 | 33 | 121.6 |
| 12 | 36 | 169.6 |
| 12 | 39 | 217.9 |
| 12 | 42 | 251.8 |
| 12 | 45 | 278.3 |
| 12 | 48 | 255.0 |
| 12 | 51 | 348.9 |
| 15 | 0 | 103.6 |
| 15 | 3 | 83.5 |
| 15 | 6 | 61.0 |
| 15 | 9 | 48.2 |
| 15 | 12 | 42.3 |
| 15 | 15 | 39.8 |
| 15 | 18 | 39.8 |
| 15 | 21 | 41.5 |
| 15 | 24 | 46.2 |
| 15 | 27 | 66.6 |
| 15 | 30 | 102.0 |
| 15 | 33 | 146.2 |
| 15 | 36 | 198.3 |
| 15 | 39 | 251.2 |
| 15 | 42 | 287.6 |
| 15 | 12 | 48.8 |
| 15 | 14 | 50.5 |
| 15 | 16 | 52.9 |
| 15 | 18 | 54.9 |
| 15 | 20 | 53.6 |
| 15 | 22 | 53.5 |
| 15 | 24 | 69.5 |
| 15 | 26 | 214.3 |
| 16 | 0 | 50.9 |
| 16 | 2 | 55.3 |
| 16 | 4 | 50.8 |
| 16 | 6 | 51.0 |
| 16 | 8 | 51.0 |
| 16 | 10 | 49.6 |
| 16 | 12 | 51.2 |
| 16 | 14 | 53.3 |
| 16 | 16 | 55.9 |
| 16 | 18 | 57.5 |
| 16 | 20 | 55.7 |
| 16 | 22 | 59.5 |
| 16 | 24 | 111.3 |
| 18 | 0 | 56.4 |
| 18 | 2 | 61.0 |
| 18 | 4 | 56.8 |
| 18 | 6 | 57.1 |
| 18 | 8 | 54.0 |
| 18 | 10 | 54.4 |
| 18 | 12 | 56.2 |
| 18 | 14 | 59.1 |
| 18 | 16 | 61.7 |
| 18 | 18 | 62.8 |
| 18 | 20 | 66.6 |
| 18 | 22 | 162.1 |
| 20 | 0 | 63.0 |
| 20 | 2 | 65.2 |
| 20 | 4 | 64.4 |
| 20 | 6 | 65.4 |
| 20 | 8 | 65.3 |
| 20 | 10 | 64.0 |
| 20 | 12 | 66.2 |
| 20 | 14 | 66.7 |
| 20 | 16 | 65.7 |
| 20 | 18 | 71.5 |

TABLE 2-continued

| χ (deg) | γ (deg) | RMS (μm) |
|---|---|---|
| 15 | 45 | 297.2 |
| 15 | 48 | 418.7 |
| 15 | 51 | 730.6 |
| 16 | 0 | 109.7 |
| 16 | 3 | 89.9 |
| 16 | 6 | 66.1 |
| 16 | 9 | 49.8 |
| 16 | 12 | 41.4 |
| 16 | 15 | 38.7 |
| 16 | 18 | 38.6 |
| 16 | 21 | 40.2 |
| 16 | 24 | 47.6 |
| 16 | 27 | 71.9 |
| 16 | 30 | 110.3 |
| 16 | 33 | 156.3 |
| 16 | 36 | 210.1 |
| 16 | 39 | 264.8 |
| 16 | 42 | 301.3 |
| 16 | 45 | 306.8 |
| 16 | 48 | 569.5 |
| 19 | 0 | 123.4 |
| 19 | 3 | 105.6 |
| 19 | 6 | 79.6 |
| 19 | 9 | 55.4 |
| 19 | 12 | 42.5 |
| 19 | 15 | 39.4 |
| 19 | 18 | 42.6 |
| 19 | 21 | 48.1 |
| 19 | 24 | 62.7 |
| 19 | 27 | 96.1 |
| 19 | 30 | 141.1 |
| 19 | 33 | 192.5 |
| 19 | 36 | 253.1 |
| 19 | 39 | 314.6 |
| 19 | 42 | 351.5 |
| 19 | 45 | 390.8 |
| 19 | 48 | 1197.6 |
| 22 | 0 | 124.1 |
| 22 | 3 | 110.5 |
| 22 | 6 | 88.6 |
| 22 | 9 | 65.7 |
| 22 | 12 | 56.4 |
| 22 | 15 | 58.3 |
| 22 | 18 | 65.4 |
| 22 | 21 | 75.3 |
| 22 | 24 | 94.5 |
| 22 | 27 | 131.1 |
| 22 | 30 | 179.5 |
| 22 | 33 | 237.2 |
| 22 | 36 | 308.5 |
| 22 | 39 | 380.3 |
| 22 | 42 | 436.0 |
| 22 | 45 | 693.6 |
| 22 | 48 | 2119.8 |
| 23 | 0 | 120.2 |
| 23 | 3 | 109.1 |
| 23 | 6 | 90.9 |
| 23 | 9 | 71.7 |
| 23 | 12 | 64.7 |
| 23 | 15 | 68.7 |
| 23 | 18 | 76.7 |
| 23 | 21 | 87.8 |
| 23 | 24 | 108.0 |
| 23 | 27 | 144.8 |
| 23 | 30 | 193.6 |
| 23 | 33 | 254.4 |
| 23 | 36 | 329.7 |
| 23 | 39 | 407.1 |
| 23 | 42 | 476.3 |
| 23 | 45 | 865.7 |
| 26 | 0 | 99.4 |
| 26 | 3 | 99.8 |
| 26 | 6 | 101.3 |
| 26 | 9 | 97.9 |
| 26 | 12 | 100.8 |
| 26 | 15 | 109.0 |
| 26 | 18 | 120.0 |
| 26 | 21 | 134.5 |
| 26 | 24 | 155.7 |
| 26 | 27 | 190.6 |
| 26 | 30 | 236.4 |
| 26 | 33 | 307.5 |
| 26 | 36 | 401.4 |
| 26 | 39 | 510.6 |
| 26 | 42 | 683.4 |
| 26 | 45 | 1572.7 |
| 29 | 0 | 80.6 |
| 29 | 3 | 93.3 |
| 29 | 6 | 115.9 |
| 29 | 9 | 128.5 |
| 29 | 12 | 141.5 |
| 29 | 15 | 157.2 |
| 29 | 18 | 175.0 |
| 29 | 21 | 193.9 |
| 29 | 24 | 213.8 |
| 29 | 27 | 238.4 |
| 29 | 30 | 282.3 |
| 29 | 33 | 363.3 |
| 29 | 36 | 492.3 |
| 29 | 39 | 688.4 |
| 29 | 42 | 1097.0 |
| 29 | 45 | 2344.3 |
| 32 | 0 | 83.1 |
| 32 | 3 | 103.9 |
| 32 | 6 | 126.8 |
| 32 | 9 | 148.4 |
| 32 | 12 | 174.9 |
| 32 | 15 | 206.1 |
| 32 | 18 | 237.6 |
| 32 | 21 | 263.7 |
| 32 | 24 | 280.3 |
| 32 | 27 | 292.7 |
| 32 | 30 | 329.3 |
| 32 | 33 | 434.9 |
| 32 | 36 | 666.7 |
| 35 | 0 | 122.7 |
| 35 | 3 | 141.0 |
| 35 | 6 | 150.0 |
| 35 | 9 | 161.8 |
| 35 | 12 | 196.1 |
| 35 | 15 | 246.6 |
| 35 | 18 | 298.3 |
| 35 | 21 | 335.4 |
| 35 | 24 | 348.6 |
| 35 | 27 | 350.6 |
| 38 | 0 | 208.7 |
| 38 | 3 | 171.8 |
| 38 | 6 | 167.8 |
| 38 | 9 | 175.1 |
| 38 | 12 | 213.5 |
| 38 | 15 | 280.0 |
| 38 | 18 | 350.7 |
| 38 | 21 | 396.5 |
| 38 | 24 | 409.6 |
| 38 | 27 | 502.2 |
| 40 | 0 | 290.3 |
| 40 | 3 | 193.4 |
| 40 | 6 | 173.9 |
| 40 | 9 | 185.9 |
| 40 | 12 | 230.6 |
| 40 | 15 | 315.1 |
| 40 | 18 | 392.7 |
| 40 | 21 | 441.3 |
| 40 | 24 | 540.0 |

9. Embodiments with Time Division Multiplexing

Figure 35:
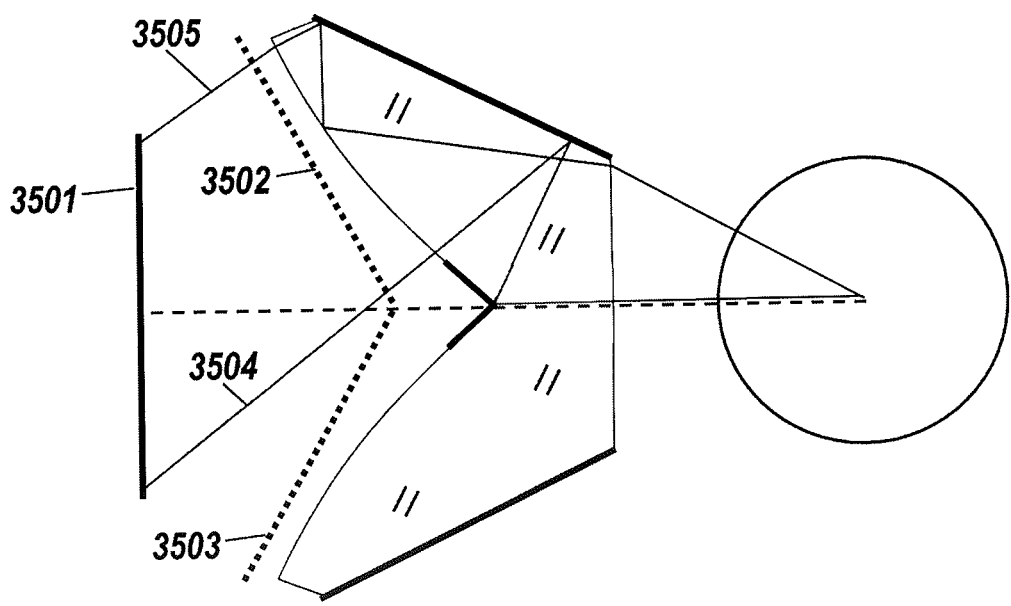
FIG. 35 is a time multiplexing embodiment using one flat shutter per lenslet.

The idea behind time multiplexing is increasing the number of ipixels by representing the image in several consecutive parts within the frame period and using all the available opixels for any of these image parts. Obviously the success of such strategy depends on the availability of digital displays with high switching rate such as OLED, transmissive or reflective FLC or DMD digital displays. This is illustrated in FIG. 35 through a 2-lenslet example where the digital display 3501 is shown on the left side of FIG. 35, and two active shutters are placed between the digital display and the 2-lenslet device. The digital display emits rays 3504 and 3505 for the top lenslet of FIG. 35. These rays are received by the eye only when the top shutter, i.e. 3502, is opened. This embodiment may use a fast ferroelectric light crystal display (FLCD) acting as a shutter. They work as a classical half-wave plate whose optic axis can be reoriented by an applied field. Benefits of FLCDs are their high resolution and very quick switching time (less than 100 μs). In U.S. Pat. No. 4,924,215 to Nelson, these FLCD are also used as shutters. According to the reference Shilov 2010, Toshiba's active-shutter stereo 3D glasses have 0.1 ms (open to close/decay) and 1.8 ms (close to open/rise) response speed, whereas many competing solutions declare 0.3 ms and 3.7 ms speeds respectively, or even 2 ms "typical" response time.

In the situation illustrated in FIG. 35, the bottom shutter 3503 is closed, hence the eye only receives light from the top lenslet. When the top shutter 3502 is closed, then the bottom shutter 3503 is opened and the eye receives information only through the bottom lenslet of the lens. As shown in FIG. 35, each lenslet corresponds to a different region of the whole field of view, so the top lenslet transmits the top half of the whole field of while the bottom lenslet transmits the bottom half of the whole field of view. These are the 2 sub-images which together fill completely the virtual screen. Strictly speaking, the two sub-images overlap since they must allow for the eye moving within the pupil range (and also because of the non-zero diameter of the human pupil), as in most of the multi-lenslet designs disclose herein. In this configuration, each frame period is divided in two subframe slots. In the first subframe slot the digital display shows the information corresponding to the top sub-image, while in the second subframe slot the digital display shows the information of the bottom sub-image. If the transition between these two different situations is performed fast enough, then the eye will perceive a global overlapped image coming from both lenslets, i.e. it will perceive a total field of view with almost double the number of pixels that we initially had in the vertical direction. This is the same effect happening in a traditional Cathode Ray Tube (CRT) where the combined persistence of the phosphor of the screen and persistence of our retina creates the illusion of a steady image from a single scanning point (only one point is being drawn at a time) when the cathode beam scans the phosphor screen.

Figure 36A:
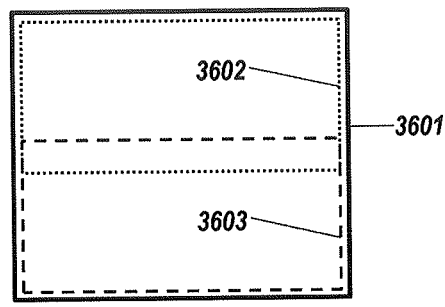
FIG. 36 shows the digital display utilization in three time multiplexing designs.

When using a 16:9 digital display for each eye, then the digital display is preferably placed in a horizontal position (i.e. with its longest dimension parallel to the floor). In this orientation, the profile of the digital display shown in FIG. 35 is its shortest side, and the time-multiplexing device will generates a rather 1:1 aspect ratio (i.e., similar vertical and horizontal fields of view). The explanation of how the vertical field of view is almost doubled can be seen in FIG. 36A, which represents the virtual screen 3601 for this design. The dotted rectangle 3602 represents the top sub-image of the virtual screen, generated by the top lenslet, while the dashed rectangle 3603 represents the bottom sub-image of the virtual screen, generated by the bottom lenslet. The addition of the two sub-images, as explained above, generates a larger square-shaped total field of view. The sub-images overlap in the central region, as shown in FIG. 36, to allow for the eye movements within the pupil range.

Figure 36B:
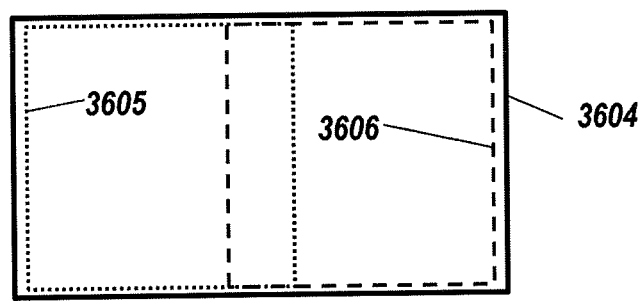

An alternative configuration uses a single standard 16:9 digital display for both eyes, instead of a digital display per eye as above. In this case, the lens is rotated 90° being placed in horizontal position, so the two halves of the shutter are aligned left-right, similarly to the design in FIG. 20. This alternative configuration leads to an elongated field of view, with a larger field of view in the horizontal direction. FIG. 36B shows the generation of the virtual screen 3604 for this design. The dotted square 3605 represents the left section of the virtual screen, generated by the left lenslet, while the dashed square 3606 represents the right section of the virtual screen, generated by the right lenslet, resulting in a larger rectangle-shaped total field of view.

Figure 36C:
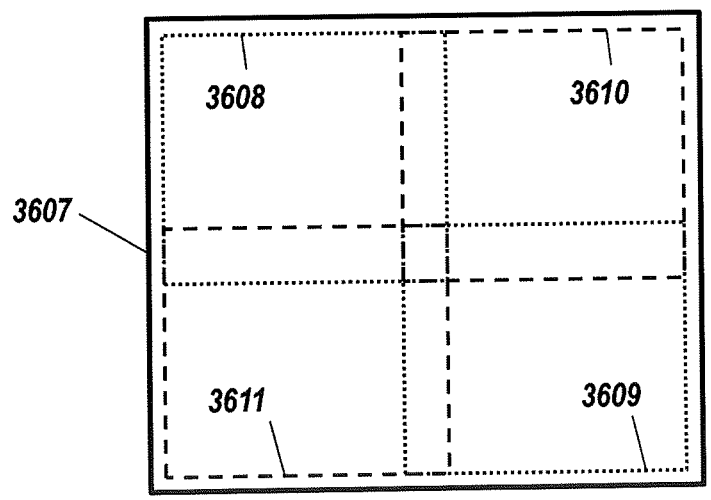
Figure 37:
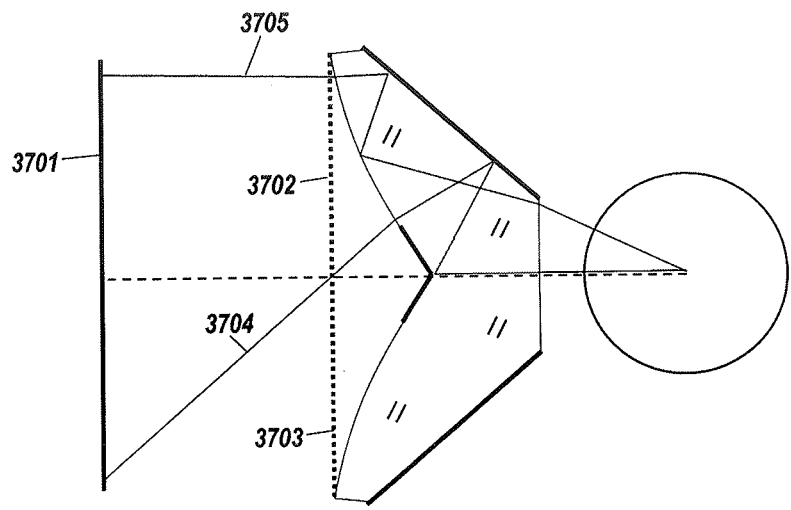
FIG. 37 is an alternative time multiplexing embodiment using coplanar shutters.

Time division multiplexing (TDM) idea can also be applied to 4-lenslet configurations, as suggested in FIG. 37, which shows the diagonal 2D cross-section of the device, showing as well the diagonal profile of the digital display 3701. The explanation of how the rays are alternatively blocked by the shutters is analogous. Obviously, in this situation we will have four shutters (one per lenslet) instead of two. FIG. 37 shows the diagonal section of two shutters, 3702 and 3703, and the extreme rays 3704 and 3705 of top lenslet in FIG. 37. The shutters shown here are all coplanar, which is easier to implement than those shown in FIG. 35. The 2-lenslet device in FIG. 35 can be slightly modified to also allow for coplanar shutters. The 4-lenslet design shown in FIG. 37 is also compatible for working with a single 16:9 digital display for both eyes but it is not restricted to a single display. Hence, the top left lenslet of the lens generates the top left section of the virtual screen, the top right lenslet generates the top right section of the virtual screen, and so on. This is represented by FIG. 36C, where the two dotted squares represent the section of the virtual screen generated by the top left and bottom right lenslets, while the dashed squares 3608 and 3609 represent the section of the virtual screen generated by the top right and bottom left lenslets, while the dashed squares 3610 and 3611 represent the section of the virtual screen generated by the top right and bottom left lenslets, resulting in a larger total field of view with aspect ratio about 1:1, i.e. with similar horizontal and vertical fields of view.

In the case of LCD digital displays (either transmissive or reflective) steerable collimated backlight for can be used as an energy efficient alternative (Fattal 2013), or a combination of such backlight with shutters. If a DMD digital display is used, selection of the lenslets to illuminate can be done with a proper design of the DMD illuminators instead of using shutters. In the DMD option, there is an illumination set per lens section. This illumination set is only ON when the DMD is showing the part of the image corresponding to that lens section. The illumination set can be realized with LEDs plus an optical system that illuminates the DMD evenly and in such directions that the light, once reflected by the DMD micromirrors in one of its stable states, reaches only the corresponding lenslet.

10. Control of Stray-Light

Stray-light is defined as light emitted by the digital display that reaches the pupil range through a path different from that considered in the optical design of the surfaces. This light should be avoided. Some of this stray-light emitted by the display may be deflected by the device towards the display again and once reflected there it may reach the pupil range through the design path creating ghost images.

There are several different configurations with different strategies for blocking the stray-light or deflecting it outside the pupil range.

Figure 38:
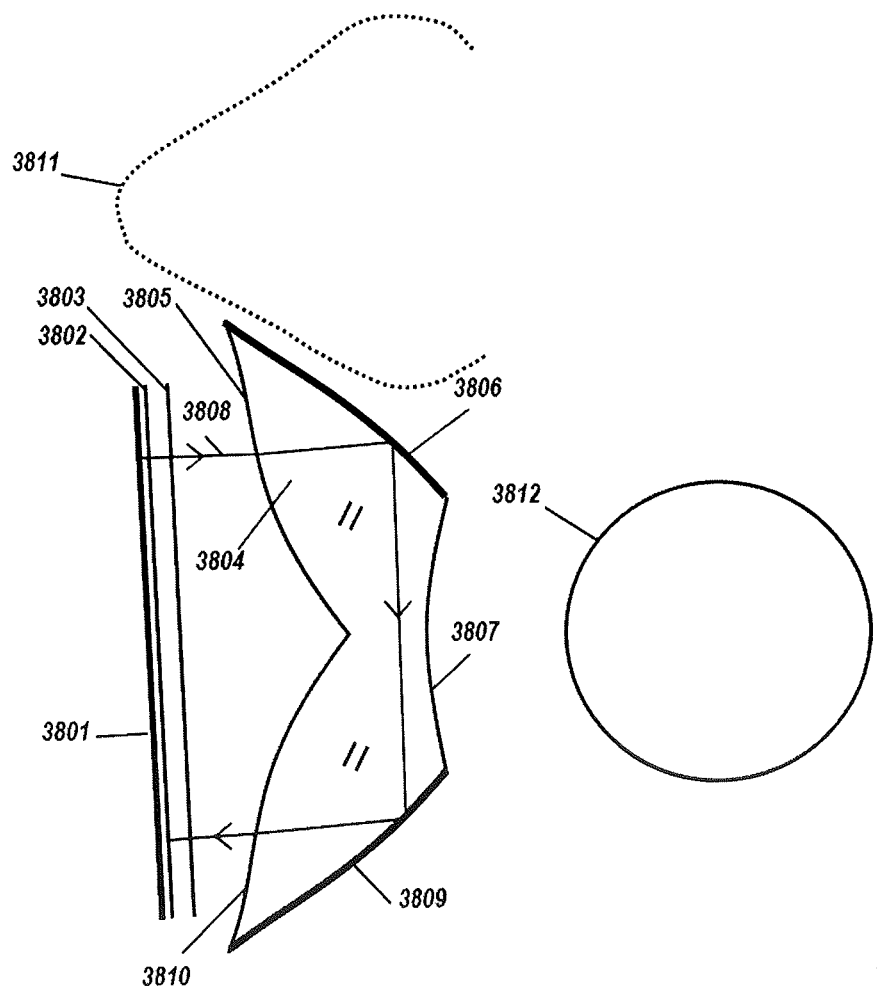
FIG. 38 is a cross-sectional view of the embodiment to minimize stray light using a half-wave retarder.

FIG. 38 shows a horizontal cross-section (top view) of one of the stray light control configurations illustrated in the example of a 2 lenslet optical element 3804. User's nose 3811 and eye 3812 are shown in FIG. 38 for orientation purposes. FIG. 38 shows the working principle of a particular stray light control: following the ray 3808 trajectory we see that light emitted by the digital display 3801 passes through the linear polarizer 3802 and afterwards through a half-wave retarder 3803 whose fast axis forms an angle of 22.5° with the input plane of polarization. A half-wave retarder 3803 rotates linearly polarized input light by twice the angle between the retarder fast axis and the input plane of polarization. Afterwards, the ray is refracted on the surface 3805 of the lens, reflected on the mirrored surface 3806, reflected once more on the mirrored surface 3809 and refracted on the surface 3810 towards the display. The light ray then passes for the second time through the half-wave retarder. Now, the angle between the retarder's fast axis and the input plane of polarization is)−112.5° (−90°-22.5°. (We adopt the direction of rotation from the half-wave retarder's fast axis towards its slow axis as the "positive" direction.) Light is rotated 225° around the retarder's fast axis and its polarization direction is changed 90° in total. As a result, the light ray is absorbed by the polarizer 3802. A more detailed illustration of this optical isolation strategy is shown in FIG. 39.

Figure 39:
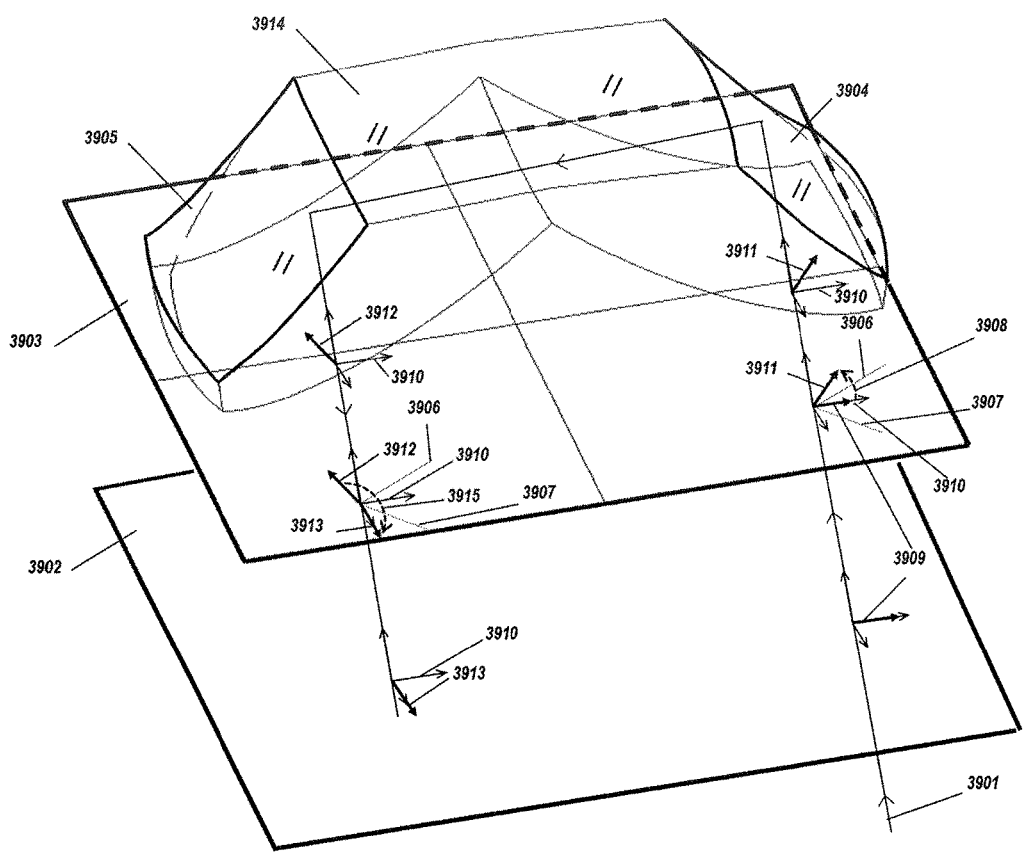
FIG. 39 is a perspective view of the same embodiment as in FIG. 38.

FIG. 39 represents a 3D view of the previously mentioned configuration that includes an absorbing linear polarizer 3902, a half-wave retarder 3903 and a 2-lenslet lens 3914. The digital display is not shown for reasons of drawing clarity. Fast axis of half-wave retarder is labeled as 3906 and its slow axis as 3907. Ray 3901 emitted from the digital display passes through the horizontally aligned polarizer 3902. Horizontal light polarization of the light exiting the polarizer 3902 is illustrated with bold arrow labeled as 3909. Horizontally polarized light falls on a half-wave plate 3903 whose fast axis 3906 and the input polarization direction 3910 form the angle of 22.5°. Rotating the half-wave plate with respect to the input light polarization direction causes input light polarization to rotate twice the angle of the half-wave plate's fast axis with the polarization plane (2×22.5°=45° illustrated with the arc 3908). We obtain at the half-wave plate's exit a linear polarization of −22.5° with respect to the fast axis labeled as 3911. After two mirror reflections on back mirrors 3904 and 3905 of the lens 3914, the light polarization will change approximately 90° with respect to the initial direction (assuming that the reflections on both reflectors are at 45 degrees incidence angle), so we will have a polarization illustrated with bold arrow 3912. Now light impinges on the half-wave retarder 3903 for the second time. The angle between retarder's fast axis and input plane of polarization is −112.5° (−90°-22.5°). Light polarization is rotated twice the angle of the half wave plate's fast axis with the polarization plane, i.e. 225°, around retarder's fast axis as illustrated with arc 3915. As a result, the polarization direction 3913 is changed 90° in total respect to the initial direction 3909. Angle between resulting light polarization direction and the half-wave retarder's fast axis is 112.5°. We have obtained light polarization illustrated with 3913 that is perpendicular to the initial polarization direction 3909 and is absorbed by polarizer 3902. Optionally, polarizer 3902 may be AR coated in order to reduce more undesired light reflections.

Alternatively, the two part configuration in FIG. 15 can be used, placing a black absorber on the surface 1518 where the two lenslets are joined together, and so without the need of retarders. Such black absorber also allows making the 2-part design in FIG. 15 without the slope discontinuity 1512 (that is, its exit surface 1504 coincides with the exit surface 1203 of the design in FIG. 12) since the absorber will prevent rays that attempt to cross the surface 1518 from reaching the pupil range.

Figure 40:
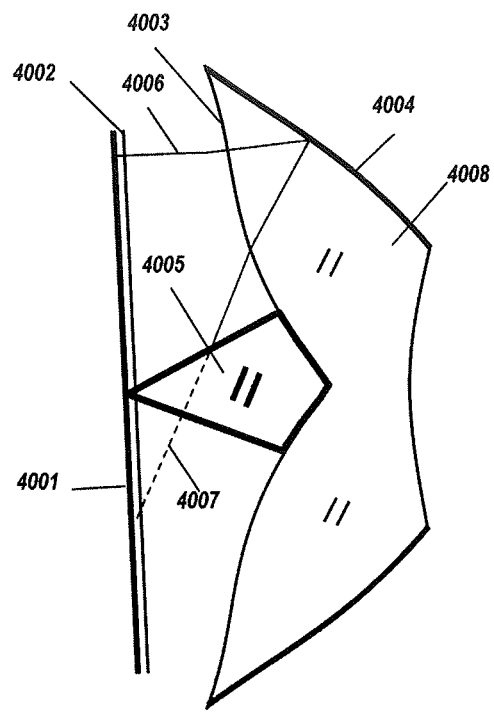
FIG. 40 shows the location of an absorber to reduce other stray light generation mechanisms.

FIG. 40 shows another possible configuration for stray light control. A black absorbing solid piece may be added in the central part of the system to shield from undesired light reaching the digital display. FIG. 40 shows the working principle of this proposal on the 2 lenslet example. Light ray 4006 emitted by a digital display 4001 passes through the matt layer on the digital display or diffusor 4002 that we may optionally add in order to reduce reflection, then it refracts on the surface 4003 of the lenslet 4008, it reflects on the mirror surface 4004, and it refracts once more on the surface 4003. We add a black piece 4005 that absorbs the light ray 4006 on its path towards the digital display. The black piece 4005 may serve as a lens support or lens holder. In most embodiments, the central part of the lens surface 4003 is metallized because the total internal reflection condition is generally not fulfilled in this area, so no additional light shadowing is introduced with this opaque piece.

Figure 41:
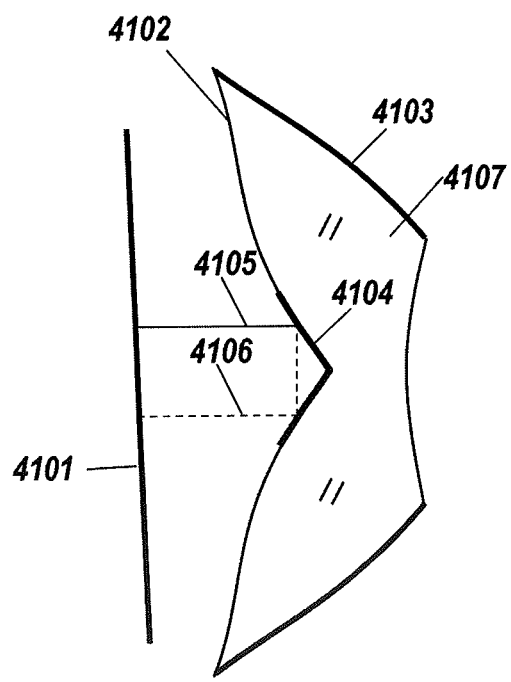
FIG. 41 shows the location of an alternative absorber to reduce other stray light generation mechanisms.

Another proposal for stray light control is shown in FIG. 41. A central exterior part 4104 of the 2 lenslet optical element 4107 is painted black in order to absorb undesired stray light coming from the digital display. Following the light path illustrated with the ray 4105, we may see how it works. Ray 4105 is emitted from the digital display 4101, then instead being reflected towards the digital display following the path 4106 drawn with dashed line, it is absorbed by the black painted part of the lens 4104. As this inner part of the lens surface 4104 is usually metalized, by painting it black we may also protect the metallization and block light coming from other directions.

Although specific embodiments have been described, the preceding description of presently contemplated modes of practicing the invention is not to be taken in a limiting sense, but is made merely for the purpose of describing certain general principles of the invention. Variations are possible from the specific embodiments described. For example, the patents and applications cross-referenced above describe systems and methods that may advantageously be combined with the teachings of the present application. Although specific embodiments have been described, the skilled person will understand how features of different embodiments may be combined.

The full scope of the invention should be determined with reference to the claims, and features of any two or more of the claims may be combined.

The invention claimed is:
1. A display device comprising:
a display, operable to generate a real image; and
an optical system, comprising one or more lenslets, arranged to generate a virtual sub-image from a respective partial real image on the display, by each lenslet projecting light from the display to an eye position;
wherein the sub-images combine to form a virtual image viewable from the eye position;
wherein at least one of the lenslets is such that the light rays from the display to the eye position are deflected sequentially at least four times by a refraction ($R_1$), a first reflection (X), a second reflection (I), and a refrac- tion ($R_2$) in that order (RXIR lenslet) such that there are a total of only two reflections;

wherein a surface where the first reflection (X) occurs is reflective and non-transmissive and, wherein the first refraction ($R_1$) and the second reflection (I) are performed by the same first-order continuous surface with a region of overlap where both refraction and, total internal reflection occur.

2. The display device of claim 1, further comprising a display driver operative to receive an input image, and to generate the respective partial real images such that the resulting virtual sub-images align to form a virtual image of said input image as said viewable virtual image.

3. The display device of claim 1, wherein the one or more lenslets comprise at least two said RXIR lenslets per eye.

4. The display device of claim 1, wherein the one or more lenslets comprise at least one said RXIR lenslet and at least one lenslet that is a non-RXIR lenslet.

5. The display device of claim 4, wherein the at least one RXIR non-lenslet generates its virtual sub-image at a central portion of the viewable virtual image, and the at least one RXIR lenslet generates its virtual sub-image at a portion of the virtual image nearer to a periphery of the viewable virtual image.

6. The display device of claim 1, wherein at least two lenslets per eye are non-superposable.

7. The display device of claim 1, arranged to produce virtual sub-images that when projected by an eye onto a retina of an eye when said eye is at the position of an imaginary sphere at said eye position with its pupil within the pupil range, the resolution of the part of the virtual sub-images that are projected onto a 1.5 mm fovea of said retina is higher than the part of the virtual sub-images projected outside the fovea.

8. The display device of claim 1, wherein the optics is placed at a distance from an eye sphere at the eye position between 5 and 40 mm, the at least one lenslet forming an array subtending a solid angle from a closest point of the eye sphere comprising a cone with 40 degrees whole angle, wherein the display is on a side of the optics remote from the eye sphere, at a distance from the optics of no more than 80 mm.

9. The display device of claim 1, wherein the respective partial real images on the display comprise at least two partial real images that overlap on a same portion of the display and that are activated during different time periods, and wherein different lenslets image said same portion of the display to different sub-images at different positions of the virtual image.

10. The display device of claim 1, further comprising a stray-light control system that removes light not contributing to the virtual sub-images.

11. The display device of claim 10, wherein the stray-light control system comprises light-absorbent material in a part of the display device not crossed by light rays contributing to the virtual sub-images.

12. The display device of claim 10, wherein the stray-light control system comprises a polarizer and a half-wave rotator arranged to absorb light reflected back towards the display.

13. The display device of claim 1, further comprising an eye tracking system using a camera.

14. A headgear comprising the display device of claim 1, with a mount for positioning the display device on a human head with the eye position of the display device coinciding with an eye of the human.

15. The headgear of claim 14, further comprising a second display device according claim 1, mounted with the eye position of the second display device coinciding with a second eye of the human.

* * * * *